(12) United States Patent
Mizuno et al.

(10) Patent No.: US 10,727,476 B2
(45) Date of Patent: Jul. 28, 2020

(54) ELECTRODE FOR LITHIUM-ION CELL, LITHIUM-ION CELL, AND METHOD FOR MANUFACTURING ELECTRODE FOR LITHIUM-ION CELL

(71) Applicants: SANYO CHEMICAL INDUSTRIES, LTD., Kyoto (JP); NISSAN MOTOR CO., LTD., Kanagawa (JP)

(72) Inventors: Yusuke Mizuno, Kyoto (JP); Yasuhiro Shindo, Kyoto (JP); Yasuhiro Tsudo, Kyoto (JP); Kenichi Kawakita, Kyoto (JP); Yuki Kusachi, Kanagawa (JP); Yasuhiko Ohsawa, Kanagawa (JP); Hajime Satou, Kanagawa (JP); Hiroshi Akama, Kanagawa (JP); Hideaki Horie, Kanagawa (JP)

(73) Assignees: SANYO CHEMICAL INDUSTRIES, LTD., Kyoto (JP); NISSAN MOTOR CO., LTD., Kanagawa (JP)

(*) Notice: Subject to any disclaimer, the term of this patent is extended or adjusted under 35 U.S.C. 154(b) by 78 days.

(21) Appl. No.: 15/951,647

(22) Filed: Apr. 12, 2018

(65) Prior Publication Data
US 2018/0301691 A1    Oct. 18, 2018

Related U.S. Application Data

(62) Division of application No. 15/105,655, filed as application No. PCT/JP2014/083027 on Dec. 12, 2014, now Pat. No. 10,276,858.

(30) Foreign Application Priority Data

Dec. 20, 2013  (JP) .................................. 2013-264023

(51) Int. Cl.
*H01M 4/131* (2010.01)
*H01M 4/13* (2010.01)
(Continued)

(52) U.S. Cl.
CPC .......... *H01M 4/131* (2013.01); *H01M 2/1673* (2013.01); *H01M 4/043* (2013.01);
(Continued)

(58) Field of Classification Search
None
See application file for complete search history.

(56) References Cited

U.S. PATENT DOCUMENTS

| 9,070,932 B2 | 6/2015 | Byon et al. |
| 2009/0280411 A1 | 11/2009 | Ohira et al. |

(Continued)

FOREIGN PATENT DOCUMENTS

| CN | 1808758 | 7/2006 |
| CN | 101212042 | 7/2008 |

(Continued)

OTHER PUBLICATIONS

International Search Report dated Mar. 17, 2015 in corresponding International (PCT) Application No. PCT/JP2014/083027.

(Continued)

*Primary Examiner* — Karie O'Neill Apicella
(74) *Attorney, Agent, or Firm* — Wenderoth, Lind & Ponack, L.L.P.

(57) ABSTRACT

The present invention aims to provide an electrode for lithium ion batteries which exhibits excellent electrical conductivity even if its thickness is large. The electrode for lithium ion batteries of the present invention includes a first main surface to be located adjacent to a separator of a lithium ion battery and a second main surface to be located adjacent to a current collector of the lithium ion battery. The electrode has a thickness of 150 to 5000 μm. The electrode contains, between the first main surface and the second main surface, a conductive member (A) made of an electronically conductive material and a large number of active material (Continued)

particles (B). At least part of the conductive member (A) forms a conductive path that electrically connects the first main surface to the second main surface. The conductive path is in contact with the active material particles (B) around the conductive path.

5 Claims, 7 Drawing Sheets

(51) Int. Cl.

| | | |
|---|---|---|
| *H01M 4/139* | (2010.01) | |
| *H01M 4/04* | (2006.01) | |
| *H01M 2/16* | (2006.01) | |
| *H01M 4/133* | (2010.01) | |
| *H01M 4/1391* | (2010.01) | |
| *H01M 4/1393* | (2010.01) | |
| *H01M 4/66* | (2006.01) | |
| *H01M 4/80* | (2006.01) | |
| *H01M 4/48* | (2010.01) | |
| *H01M 4/485* | (2010.01) | |
| *H01M 4/583* | (2010.01) | |
| *H01M 4/62* | (2006.01) | |
| *H01M 10/0525* | (2010.01) | |
| *H01M 4/36* | (2006.01) | |
| *H01M 4/02* | (2006.01) | |

(52) U.S. Cl.
CPC ....... *H01M 4/0404* (2013.01); *H01M 4/0416* (2013.01); *H01M 4/0471* (2013.01); *H01M 4/13* (2013.01); *H01M 4/133* (2013.01); *H01M 4/139* (2013.01); *H01M 4/1391* (2013.01); *H01M 4/1393* (2013.01); *H01M 4/483* (2013.01); *H01M 4/485* (2013.01); *H01M 4/624* (2013.01); *H01M 4/625* (2013.01); *H01M 4/661* (2013.01); *H01M 4/663* (2013.01); *H01M 4/667* (2013.01); *H01M 4/806* (2013.01); *H01M 4/808* (2013.01); *H01M 10/0525* (2013.01); *H01M 4/366* (2013.01); *H01M 2004/021* (2013.01); *Y02T 10/7011* (2013.01)

(56) References Cited

U.S. PATENT DOCUMENTS

| | | |
|---|---|---|
| 2011/0070495 A1 | 3/2011 | Ban et al. |
| 2012/0135297 A1 | 5/2012 | Zhang |
| 2012/0171566 A1 | 7/2012 | Yoshitake et al. |
| 2012/0328923 A1 | 12/2012 | Sawai et al. |
| 2014/0079995 A1 | 3/2014 | Wakada |
| 2014/0170524 A1* | 6/2014 | Chiang ................ H01M 8/188 429/482 |

FOREIGN PATENT DOCUMENTS

| | | |
|---|---|---|
| CN | 101404330 | 4/2009 |
| CN | 103187591 | 7/2013 |
| JP | 6-338330 | 12/1994 |
| JP | 9-204936 | 8/1997 |
| JP | 11-7981 | 1/1999 |
| JP | 2006-318759 | 11/2006 |
| JP | 2009-146580 | 7/2009 |
| JP | 2010-9905 | 1/2010 |
| JP | 2011-86480 | 4/2011 |
| JP | 2011-210666 | 10/2011 |
| JP | 2013-196956 | 9/2013 |
| JP | 2013-218895 | 10/2013 |
| JP | 2013-538002 | 10/2013 |
| JP | 2013-246945 | 12/2013 |
| WO | 2007/145015 | 12/2007 |
| WO | 2012/140790 | 10/2012 |
| WO | 2012/165422 | 12/2012 |

OTHER PUBLICATIONS

International Preliminary Report on Patentability dated Jun. 23, 2016 in corresponding International (PCT) Application No. PCT/JP2014/083027.

Showa Denko, "Vapor Grown Carbon Fiber", retrieved from the Internet: URL:http://www.sdkc.com/documents/VGCF-H.pdf, Nov. 15, 2016, XP055319514.

* cited by examiner

Pressurization

Depressurization

ELECTRODE FOR LITHIUM-ION CELL, LITHIUM-ION CELL, AND METHOD FOR MANUFACTURING ELECTRODE FOR LITHIUM-ION CELL

TECHNICAL FIELD

The present invention relates to an electrode for lithium ion batteries, a lithium ion battery, and a method of producing an electrode for lithium ion batteries.

BACKGROUND ART

Reduction in carbon dioxide emissions has been strongly desired in recent years for environmental protection. The automotive industry has placed great expectations on the introduction of electric vehicles (EVs) or hybrid electric vehicles (HEVs) to reduce carbon dioxide emissions and has been extensively developing secondary batteries for driving the motors, the key to practical use of these vehicles. Secondary batteries that have received attention include lithium ion batteries, which have high energy density and high output power density.

A typical lithium ion secondary battery includes an electrode composed of a positive electrode current collector with a positive electrode active material applied thereto together with a binder and an electrode composed of a negative electrode current collector with a negative electrode active material applied thereto together with a binder. A bipolar battery includes a bipolar electrode composed of a current collector with a positive electrode layer on one side and a negative electrode layer on the other side. The positive electrode layer is formed by applying a positive electrode active material together with a binder to one side of the current collector. The negative electrode layer is formed by applying a negative electrode active material together with a binder to the other side (see Patent Literature 1, for example).

In Patent Literature 1, paste for forming electrodes is applied at a thickness of about 25 µm. Increasing the proportion of the positive electrode material and the negative electrode material in a battery is known as a way to increase the energy density of the battery. Patent Literature 2 discloses a method for increasing energy density of a battery, in which the film thickness of the electrodes is increased to reduce the relative proportion of the current collector and the separator.

CITATION LIST

Patent Literature

Patent Literature 1: JP 2011-86480 A
Patent Literature 2: JP H09-204936 A

SUMMARY OF INVENTION

Technical Problem

As described in Patent Literature 2, increasing the film thickness of an electrode reduces the relative proportion of the current collector and the separator. This is considered effective for achieving higher battery capacity.

However, in a bipolar electrode, increasing the electrode thickness increases the proportion of active materials located far from the current collector. Since active materials themselves do not have high electron conductivity, electrons will not smoothly move from such active materials far from the current collector to the current collector. Thus, even if the amount of active materials become larger, simply increasing the electrode thickness results in a higher proportion of active materials that are less electronically conductive and not effectively used. As a result, the battery fails to have higher capacity despite the increased electrode thickness.

As the active materials themselves do not have high electron conductivity, they have been blended with particulates such as acetylene black serving as a conductive additive to enhance the electron conductivity. However, in an electrode with an increased thickness, it is difficult for such a particulate conductive additive to exert the effect of enhancing the electron conductivity.

Solution to Problem

The present inventors made intensive studies to solve the above problems. They have found that excellent electron conductivity can be achieved, even in an electrode with an increased thickness, by forming a conductive path that electrically connects surfaces of the electrode along the thickness direction of the electrode so that electrons generated from the active material can flow through the conductive path to the current collector. The inventors thus arrived at the present invention.

The present invention relates to an electrode for lithium ion batteries, the electrode including a first main surface to be located adjacent to a separator of a lithium ion battery and a second main surface to be located adjacent to a current collector of the lithium ion battery, wherein the electrode has a thickness of 150 to 5000 µm, the electrode contains, between the first main surface and the second main surface, a conductive member (A) made of an electronically conductive material and a large number of active material particles (B), at least part of the conductive member (A) forms a conductive path that electrically connects the first main surface to the second main surface, and the conductive path is in contact with the active material particles (B) around the conductive path; a lithium ion battery including the electrode for lithium ion batteries of the present invention as at least one of a negative electrode and a positive electrode; a method of producing the electrode for lithium ion batteries of the present invention, including step (P1) of providing a structure (Z) that contains the conductive member (A), has voids therein, and has a first main surface and a second main surface, step (P2) of applying a slurry (X) containing the active material particles (B) to the first main surface or the second main surface of the structure (Z), and step (P3) of filling the voids in the structure (Z) with the active material particles (B) by pressurization or depressurization; a method of producing the electrode for lithium ion batteries of the present invention, including step (Q1) of applying a slurry (Y) containing the conductive member (A) and the active material particles (B) to a film (E) and step (Q2) of fixing the active material particles (B) and the conductive member (A) onto the film (E) by pressurization or depressurization; a method of producing the electrode for lithium ion batteries of the present invention, including step (T1) of applying a slurry (Y) containing the conductive member (A) and the active material particles (B) to a current collector to form a slurry layer on the current collector and step (T2) of disposing a separator on the slurry layer and absorbing liquid from an upper surface of the separator so as to fix the active material particles (B) and the conductive member (A) between the current collector and the separator; and a method of producing an electrode for lithium ion batteries, the electrode including a first main surface to be located adjacent to a separator of a lithium ion battery and a second main surface to be located adjacent to a current collector of the lithium ion battery, wherein the electrode contains, between the first main surface and the second main surface, a conductive member (A) made of an electronically conductive material, a large number of active material particles (B), and a resin (F), at least part of the conductive member (A) forms a conductive path that electrically connects the first main surface to the second main surface, and the conductive path is in contact with the active material particles (B) around the conductive path, the method including step (R1) of hot-pressing a composition for an electrode containing the conductive member (A), the active material particles (B), and the resin (F) so as to fix the conductive member (A) and the active material particles (B) by the resin (F).

Advantageous Effects of Invention

The electrode for lithium ion batteries of the present invention includes, between the first main surface and the second main surface of the electrode, a conductive member made of an electronically conductive material. The conductive member forms a conductive path that electrically connects the first main surface to the second main surface, and thus electrons generated from the active material can flow through the conductive path to the current collector. Even if the electrode has an increased thickness of 150 to 5000 μm and contains the active material in a relatively large amount, electrons from an active material far from the current collector smoothly reach the current collector. The electrode for lithium ion batteries of the present invention thus is excellent in the electron conductivity and suitable for increasing the capacity of a lithium ion battery.

DESCRIPTION OF EMBODIMENTS

The present invention will be described in detail below.

The electrode for lithium ion batteries of the present invention includes a first main surface to be located adjacent to a separator of a lithium ion battery and a second main surface to be located adjacent to a current collector of the lithium ion battery. The electrode has a thickness of 150 to 5000 μm. The electrode contains, between the first main surface and the second main surface, a conductive member (A) made of an electronically conductive material and a large number of active material particles (B). At least part of the conductive member (A) forms a conductive path that electrically connects the first main surface to the second main surface. The conductive path is in contact with the active material particles (B) around the conductive path.

In one embodiment of the electrode for lithium ion batteries of the present invention, the conductive member (A) includes conductive fibers constituting a part of a nonwoven fabric. In another embodiment, the conductive member (A) includes conductive fibers constituting a part of a woven fabric or a knitted fabric. In yet another embodiment, the conductive member (A) includes conductive fibers dispersed between the first main surface and the second main surface. In yet another embodiment, the conductive member (A) includes a resin provided with conductivity and constituting a part of foamed resin.

First, among the embodiments of the electrode for lithium ion batteries of the present invention, the one in which the conductive member (A) includes conductive fibers constituting a part of a nonwoven fabric is described below with reference to drawings.

Figure 1:
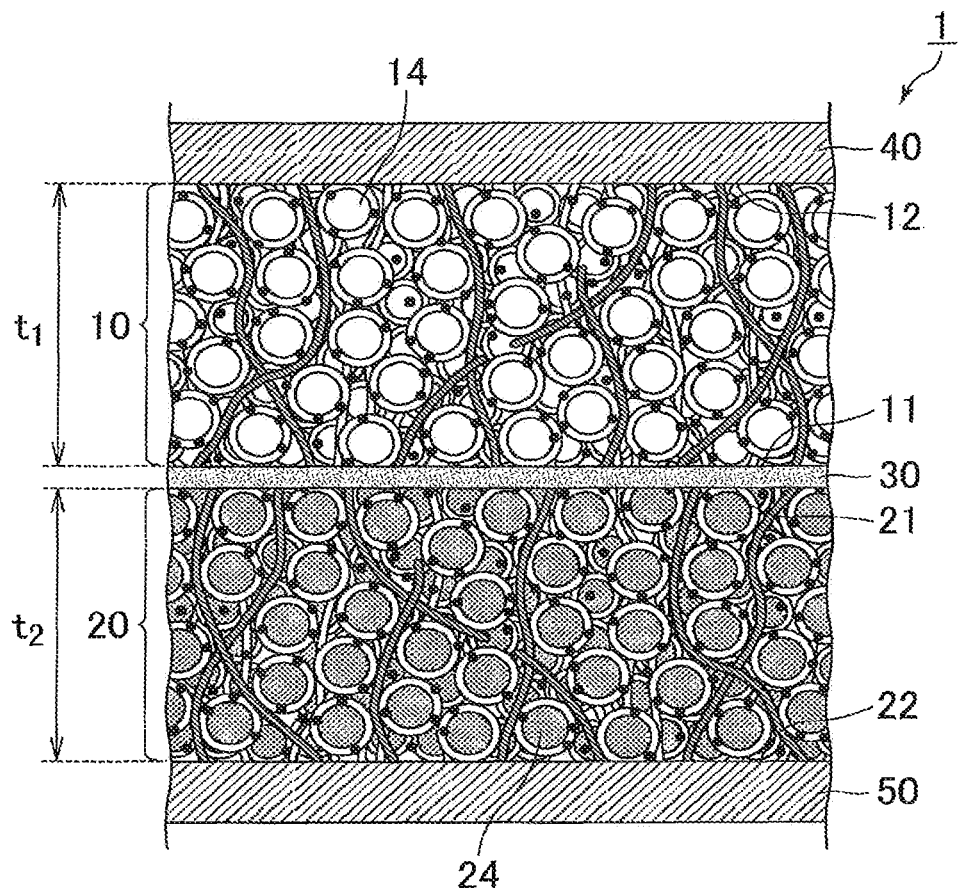
FIG. 1 is a schematic cross-sectional view of an example of a structure of a lithium ion battery including the electrode for lithium ion batteries according to the present invention as a positive electrode and a negative electrode.

FIG. 1 is a schematic cross-sectional view of an example of a structure of a lithium ion battery including the electrode for lithium ion batteries according to the present invention as a positive electrode and a negative electrode.

A lithium ion battery 1 illustrated in FIG. 1 includes a positive electrode 10 and a negative electrode 20. A separator 30 is provided between the positive electrode 10 and the negative electrode 20.

A current collector 40 is provided on a surface of the positive electrode 10 opposite the separator 30. A current collector 50 is provided on a surface of the negative electrode 20 opposite the separator 30. In short, these components are stacked in the order of current collector 40-positive electrode 10-separator 30-negative electrode 20-current collector 50. They, in combination, form the lithium ion battery 1.

The electrode for lithium ion batteries of the present invention includes neither a separator nor a current collector. Each of the positive electrode 10 and the negative electrode 20 illustrated in FIG. 1 is the electrode for lithium ion batteries according to the present invention.

The positive electrode 10 is a sheet-form electrode having a specific thickness t1. The positive electrode 10 has a first main surface 11 that is located adjacent to the separator 30 and a second main surface 12 that is located adjacent to the current collector 40. The positive electrode 10 contains positive electrode active material particles 14.

Similar to the positive electrode 10, the negative electrode 20 is a sheet-form electrode having a specific thickness t2. The negative electrode 20 has a first main surface 21 that is located adjacent to the separator 30 and a second main surface 22 that is located adjacent to the current collector 50. The negative electrode 20 contains negative electrode active material particles 24.

The thickness t1 of the positive electrode 10 and the thickness t2 of the negative electrode 20 are each 150 to 5000 µm. With such thick electrodes, a battery can contain a large amount of active materials, which leads to a lithium ion battery with higher capacity.

The thickness t1 of the positive electrode for lithium ion batteries according to the present invention is preferably 150 to 1500 µm, more preferably 200 to 950 µm, still more preferably 250 to 900 µm.

The thickness t2 of the negative electrode for lithium ion batteries according to the present invention is preferably 150 to 1500 µm, more preferably 200 to 950 µm, still more preferably 250 to 900 µm.

Such a lithium ion battery including the electrode for lithium ion batteries of the present invention as at least one of a negative electrode and a positive electrode is the lithium ion battery of the present invention.

Next, the electrode for lithium ion batteries of the present invention is described.

Figure 2:
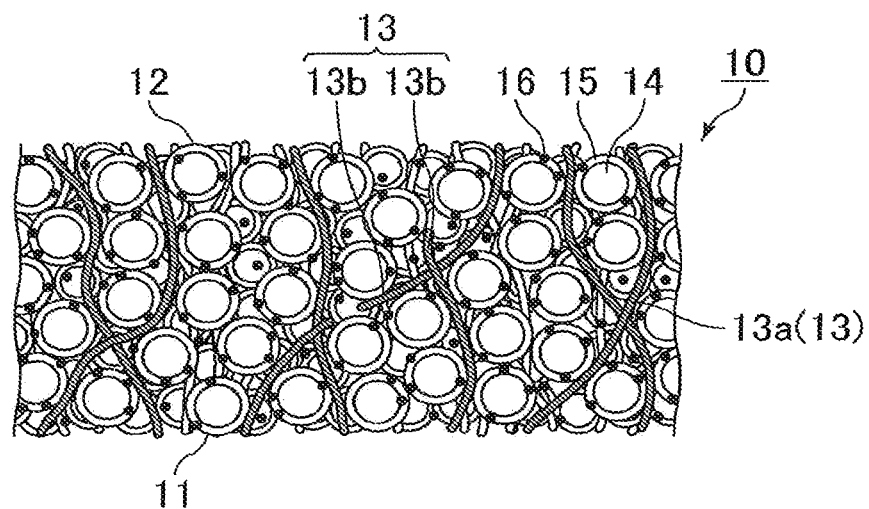
FIG. 2 is a schematic cross-sectional view of only the positive electrode of the lithium ion battery illustrated in FIG. 1.

FIG. 2 is a schematic cross-sectional view of only the positive electrode of the lithium ion battery illustrated in FIG. 1.

The positive electrode 10 has the first main surface 11 and the second main surface 12, as mentioned above. The positive electrode 10 contains, between the first main surface 11 and the second main surface 12, conductive fibers 13 as the conductive member (A) and positive electrode active material particles 14 as the active material particles (B).

In the embodiment illustrated in FIG. 2, the conductive member (A) includes conductive fibers 13 constituting a part of a nonwoven fabric. The nonwoven fabric has many voids. By filling the voids with the active material particles, the electrode for lithium ion batteries can be formed. Filling the voids with the active material particles will be described in the section of the method of producing the electrode for lithium ion batteries of the present invention.

Part of the conductive fibers 13 has one end extending to the first main surface 11 and the other end extending to the second main surface 12. In other words, at least part of the conductive fibers 13 forms a conductive path that electrically connects the first main surface 11 to the second main surface 12.

A large number of conductive fibers 13 are intertwined with each other between the first main surface 11 and the second main surface 12. If multiple conductive fibers 13 are in contact with each other and continuously connect the first main surface 11 to the second main surface 12, the conductive fibers are also regarded as forming a conductive path that electrically connect the first main surface to the second main surface.

FIG. 2 shows examples of conductive fibers 13 corresponding to conductive paths that electrically connect the first main surface 11 to the second main surface 12. Specifically, a conductive fiber 13a shows an example of a single conductive fiber forming a conductive path. Two conductive fibers 13b show an example of conductive fibers being in contact with each other to form a conductive path.

Examples of the conductive fibers include carbon fibers such as PAN carbon fibers and pitch carbon fibers, conductive fibers containing a highly conductive metal or graphite uniformly dispersed in synthetic fibers, metal fibers obtained by converting metals such as stainless steel into fibers, conductive fibers containing organic fibers whose surface is coated with a metal, and conductive fibers containing organic fibers whose surface is coated with a resin containing a conductive substance. Among these conductive fibers, carbon fibers are preferred.

In the electrode of the present invention, if the conductive member (A) includes conductive fibers, the conductive fibers preferably have an electrical conductivity of 50 mS/cm or more, more preferably 80 to 500 mS/cm. The electrical conductivity of the conductive fibers can be determined by measuring the volume resistivity in accordance with JIS R 7609 "Carbon fibre—Determination of volume resistivity" and calculating the reciprocal of the volume resistivity.

If the conductive fibers have an electrical conductivity of 50 mS/cm or more, the conductive paths that are formed of the conductive fibers and connect the first main surface to the second main surface have small electrical resistance. This advantageously enables smooth transfer of electrons from the active material far from the current collector.

The conductive fibers preferably have an average fiber diameter of 0.1 to 20 µm, more preferably 0.5 to 2.0 µm.

The fiber diameter of the conductive fibers is measured by SEM observation. The average fiber diameter of the conductive fibers is determined as follows. Ten conductive fibers are randomly selected in a 30-µm square field of view. The diameter at or near the middle of each of the ten fibers is measured. This measurement is performed at three fields of view. The average of the diameters of a total of 30 fibers is taken as the measured value.

The conductive fibers may have any fiber length. The total fiber length of the conductive fibers per unit volume of the electrode is preferably 10,000 to 50,000,000 cm/cm$^3$, more preferably 20,000 to 50,000,000 cm/cm$^3$, still more preferably 1,000,000 to 10,000,000 cm/cm$^3$.

The total fiber length of the conductive fibers per unit volume of the electrode is calculated by the following formula.

(Total fiber length of conductive fibers per unit volume of electrode)=[(average fiber length of conductive fibers)×(weight of conductive fibers used per unit volume of electrode)/(specific gravity of conductive fibers)]/[(unit area of electrode)×(electrode thickness)]

The average fiber length of the conductive fibers is measured by SEM observation. Specifically, ten fibers are randomly selected in a 30-µm square field of view. The length of each of the ten fibers is measured. This measurement is performed at three fields of view. The average of the lengths of a total of 30 fibers is taken as the measured value of the average fiber length of the conductive fibers.

The positive electrode active material particles 14 are active material particles filling the voids in the nonwoven fabric. Examples of the positive electrode active material particles include particles of complex oxides of lithium and transition metals (e.g., LiCoO$_2$, LiNiO$_2$, LiMnO$_2$, LiMn$_2$O$_4$), particles of transition metal oxides (e.g., MnO$_2$, V$_2$O$_5$), particles of transition metal sulfides (e.g., MoS$_2$, TiS$_2$), and particles of conductive polymers (e.g., polyaniline, polypyrrole, polythiophene, polyacetylene, poly-p-phenylene, polyvinylcarbazole).

In the electrode of the present invention, the active material particles (B) preferably include coated active material particles whose surface is at least partially coated with a coating agent containing a coating resin and a conductive additive.

In the embodiment illustrated in FIG. 2, positive electrode active material particles 14 are coated with a coating agent 15. The coating agent contains a coating resin. If the positive electrode active material particles are coated with a coating agent, change in the volume of the electrode can be reduced, and the expansion of the electrode can be suppressed. Examples of the coating resin include vinyl resins, urethane resins, polyester resins, polyamide resins, epoxy resins, polyimide resins, silicone resins, phenol resins, melamine resins, urea resins, aniline resins, ionomer resins, and polycarbonates. Among these resins, vinyl resins, urethane resins, polyester resins, and polyamide resins are preferred.

The conductive paths formed of the conductive fibers 13 are in contact with the positive electrode active material particles 14 around the conductive paths. Such contact of the conductive paths with the positive electrode active material particles allows the electrons generated from the positive electrode active material particles to quickly reach the conductive paths and flow through the conductive paths to the current collector. Since the conductive paths are formed of the conductive member that is an electronically conductive material, electrons can smoothly reach the current collector.

In the case where the active material particles are coated active material particles, a conductive path in contact with the coating agent can be regarded as being in contact with the active material particles.

In an electrode without such a conductive path, electrons have to pass through active material particles, which are not highly electronically conductive, and thus they are less likely to smoothly reach the current collector. In the case where electrons are conducted via a conductive additive consisting of particulates, there is electrical resistance between the particles. In addition, since the particles of the conductive additive are not continuously joined to one another, electrons unavoidably pass through regions with high electrical resistance. Electrons are thus less likely to smoothly reach the current collector.

In the foregoing description, the move of electrons is described referring to cases in which electrons generated from the positive electrode active material particles flow to the current collector. Similarly, electrons flowing from the current collector to the positive electrode active material particles can pass through conductive paths and smoothly reach the positive electrode active material particles. That is, the same effects can be obtained in charging and discharging.

The positive electrode 10 may further contain a conductive additive 16.

The conductive additive is selected from conductive materials.

Specific examples thereof include, but not limited to, metals [e.g., aluminum, stainless steel (SUS), silver, gold, copper, titanium], carbon [e.g., graphite, carbon blacks (acetylene black, ketjen black, furnace black, channel black, thermal lamp black)], and mixtures thereof.

These conductive additives may be used alone or two or more thereof may be used in combination. Alloys or metal oxides thereof may be used. From the viewpoint of the electrical stability, aluminum, stainless steel, carbon, silver, gold, copper, titanium, and mixtures thereof are preferred, silver, gold, aluminum, stainless steel, and carbon are more preferred, and carbon is still more preferred. The conductive additive may be a particulate ceramic material or resin material coated with a conductive material (any of the metals mentioned above as materials of the conductive additive) by plating, for example.

The conductive additive 16 may be contained in the coating agent 15, or may be in contact with the positive electrode active material particles 14. If the conductive additive is contained in the coating agent or in contact with the positive electrode active material particles, electron conductivity from the positive electrode active material particles to the conductive paths can be further enhanced.

If the electrode for lithium ion batteries of the present invention is a negative electrode, the electrode may have the same configuration except that negative electrode active material particles are used as active material particles (B) instead of the positive electrode active material particles.

Examples of the negative electrode active material particles include particles of graphite, non-graphitizable carbon, amorphous carbon, products obtained by firing polymer compounds (e.g., products obtained by firing and carbonizing phenolic resins or furan reins), cokes (e.g., pitch coke, needle coke, petroleum coke), carbon fibers, conductive polymers (e.g., polyacetylene, polypyrrole), tin, silicon, and metal alloys (e.g., lithium-tin alloy, lithium-silicon alloy, lithium-aluminum alloy, lithium-aluminum-manganese alloy), and complex oxides of lithium and transition metals (e.g., $Li_4Ti_5O_{12}$).

Also in the negative electrode, the conductive path is in contact with negative electrode active material particles around the conductive path. As in the case of the positive electrode, electrons generated from the negative electrode active material particles quickly reach the conductive path and pass through the conductive path smoothly to the current collector. Similarly, electrons flowing from the current collector to the negative electrode active material particles can smoothly reach the negative electrode active material.

Figure 3:
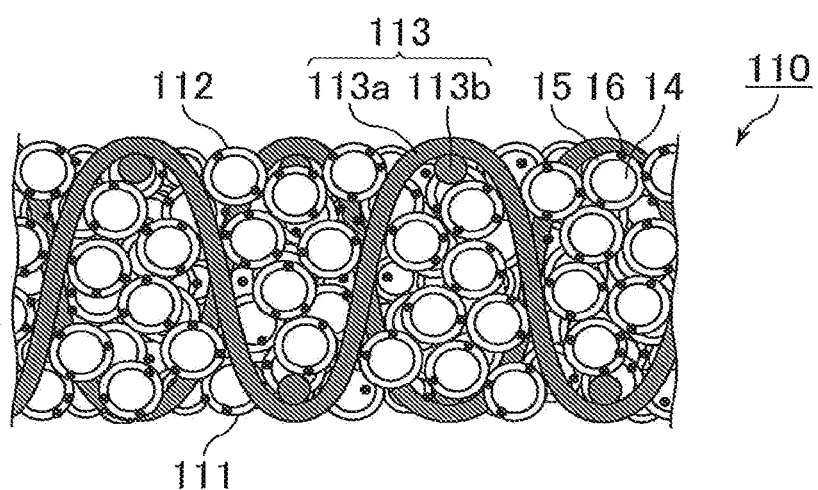
FIG. 3 is a schematic cross-sectional view of an example of another embodiment of the electrode for lithium ion batteries of the present invention.

FIG. 3 is a schematic cross-sectional view of an example of another embodiment of the electrode for lithium ion batteries of the present invention.

In an electrode (positive electrode) 110 according to the embodiment illustrated in FIG. 3, the conductive member (A) includes conductive fibers 113 constituting a woven fabric. The woven fabric is composed of warp yarns 113*a* and weft yarns 113*b* formed of the conductive fibers. The electrode (positive electrode) 110 according to the embodiment illustrated in FIG. 3 has the same configuration as that according to the embodiment illustrated in FIG. 2, except that a fabric-form fiber structure corresponding to the nonwoven fabric in FIG. 2 is a woven fabric.

The woven fabric may be woven by any method. Usable woven fabrics include those woven by plain weaving, twill weaving, satin weaving, or pile weaving.

Instead of the woven fabric, a knitted fabric composed of the conductive fibers may be used.

The knitted fabric may be knitted by any method. Usable knitted fabrics include those knitted by weft knitting, warp knitting, or circular knitting.

Similar to the nonwoven fabric, the woven fabric and the knitted fabric have many voids between the conductive fibers constituting them. An electrode for lithium ion batteries can be formed by filling the voids with active material particles.

At least part of the conductive fibers 113 has a portion extending to the first main surface 111 and another portion extending to the second main surface 112. In other words, at least part of the conductive fibers 113 forms a conductive path that electrically connects the first main surface 111 and the second main surface 112.

Other factors such as preferred conductive fibers and preferred active materials are the same as those for the electrode for lithium ion batteries illustrated in FIG. 2. The description thereof is omitted here.

The electrode 110 can serve as a negative electrode for lithium ion batteries according to the present invention if the active material particles (B) are negative electrode active material particles.

Figure 4:
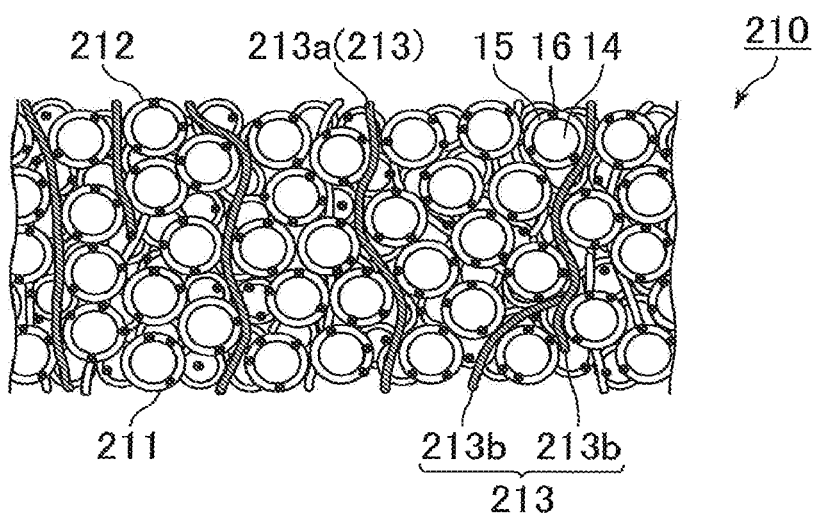
FIG. 4 is a schematic cross-sectional view of an example of yet another embodiment of the electrode for lithium ion batteries of the present invention.

FIG. 4 is a schematic cross-sectional view of an example of yet another embodiment of the electrode for lithium ion batteries of the present invention.

In an electrode (positive electrode) 210 according to the embodiment illustrated in FIG. 4, the conductive member (A) includes conductive fibers 213 dispersed between a first main surface 211 and a second main surface 212.

The conductive fibers 213 are not part of a structure formed of conductive fibers, such as the nonwoven fabric, the woven fabric, or the knitted fabric illustrated in FIG. 2 and FIG. 3. This electrode is produced using a slurry containing the conductive fibers and the active material particles. The method for producing the electrode according to the embodiment illustrated in FIG. 4 will be described later. In this electrode, the conductive fibers are dispersed in the active material particles. This electrode should not be regarded as one in which voids between fibers are filled with active material particles.

At least part of the conductive fibers 213 has a portion extending to the first main surface 211 and another portion extending to the second main surface 212. In other words, at least part of the conductive fibers 213 forms a conductive path that electrically connects the first main surface 211 to the second main surface 212.

In FIG. 4, a conductive fiber 213a shows an example of a single conductive fiber forming a conductive path. Two conductive fibers 213b show an example of two fibers in contact with each other forming a conductive path.

Other factors such as preferred conductive fibers and preferred active materials are the same as those for the electrode for lithium ion batteries illustrated in FIG. 2. The description thereof is omitted here. The electrode 210 can serve as a negative electrode for lithium ion batteries according to the present invention if the active material particles (B) are negative electrode active material particles.

In the electrode for lithium ion batteries according to the embodiment illustrated in FIG. 4, the conductive fibers as the conductive member (A) and the active material particles (B) may be fixed onto a film (E) such that the fixed shape can be retained loosely to the extent that they do not flow. If the film (E) is made of a material having high conductivity (conductive material), the film (E) can substitute for a current collector. In addition, the conductivity is not inhibited even if the film (E) contacts with a current collector. Thus, the film is preferably made of a conductive material. The film (E) is not shown in FIG. 4. The method of producing the electrode for lithium ion batteries in which the conductive fibers as the conductive member (A) and the active material particles (B) are fixed onto the film (E) will be described later.

In the electrode for lithium ion batteries of the present invention, the conductive fibers as the conductive member (A) and the active material particles (B) may be fixed by a resin (F) to keep the conductive fibers dispersed in the active material particles in a lithium ion battery.

Figure 5:
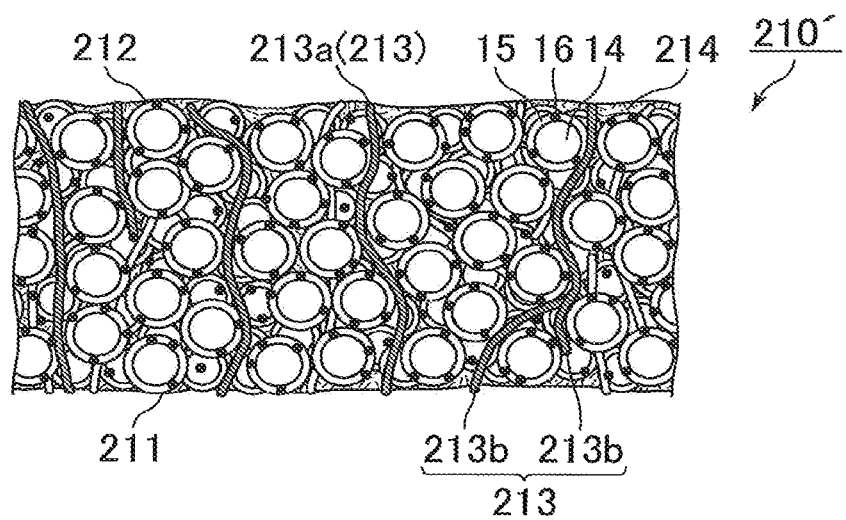
FIG. 5 is a schematic cross-sectional view of an example of yet another embodiment of the electrode for lithium ion batteries of the present invention.

FIG. 5 is a schematic cross-sectional view of an example of yet another embodiment of the electrode for lithium ion batteries of the present invention. An electrode (positive electrode) 210' illustrated in FIG. 5 has the same configuration as that according to the embodiment illustrated in FIG. 4 except that the conductive fibers 213 as the conductive member (A) and the positive electrode active material particles 14 as the active material particles (B) are fixed by a resin 214.

Examples of the resin (F) include vinyl resins, urethane resins, polyester resins, and polyamide resins.

The method for producing the electrode for lithium ion batteries in which the conductive fibers as the conductive member (A) and the active material particles (B) are fixed by a resin (F) will be described later.

Figure 6:
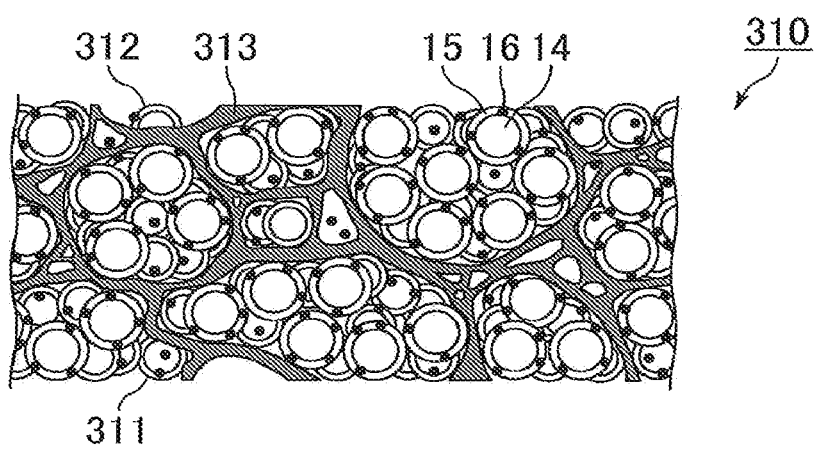
FIG. 6 is a schematic cross-sectional view of an example of yet another embodiment of the electrode for lithium ion batteries of the present invention.

FIG. 6 is a schematic cross-sectional view of an example of yet another embodiment of the electrode for lithium ion batteries of the present invention.

In an electrode (positive electrode) 310 according to the embodiment illustrated in FIG. 6, the conductive member (A) includes a resin 313 provided with conductivity and constituting a part of a foamed resin. The foamed resin has many voids. An electrode for lithium ion batteries can be formed by filling the voids with the active material particles.

The resin provided with conductivity may be, for example, a resin provided with conductivity obtained by forming a conductive thin film on the surface of a resin, or a resin provided with conductivity obtained by mixing a resin with a conductive filler such as a metal or carbon fibers. The resin itself may be a conductive polymer. The conductive polymer may be further provided with conductivity.

The conductive thin film may be formed on the surface of a resin by, for example, metal plating, a deposition treatment, or a sputtering treatment.

In the embodiment illustrated in FIG. 6, a resin 313 provided with conductivity is continuous from a first main surface 311 to a second main surface 312. The resin 313 provided with conductivity forms a conductive path that electrically connects the first main surface 311 to the second main surface 312.

The foamed resin including the resin provided with conductivity is preferably a resin foam, such as a polyurethane foam, a polystyrene foam, a polyethylene foam, or a polypropylene foam.

In particular, the foamed resin is preferably a polyurethane foam whose surface is plated with a metal such as nickel.

In the electrode of the present invention, if the conductive member (A) is a foamed resin including a resin provided with conductivity, the foamed resin including a resin provided with conductivity preferably has an electrical conductivity of 100 mS/cm or more, more preferably 150 to 500 mS/cm.

The electrical conductivity of the foamed resin can be determined by the four-terminal method.

If the foamed resin including a resin provided with conductivity has an electrical conductivity of 100 mS/cm or more, the conductive paths that are formed of the conductive fibers and connect the first main surface to the second main surface have small electrical resistance. This advantageously enables smooth transfer of electrons from the active material far from the current collector.

Preferred active material particles are the same as those for the electrode for lithium ion battery illustrated in FIG. 2. The description thereof is omitted here. If the active material particles (B) are negative electrode active material particles, the electrode 310 can serve as a negative electrode for lithium ion batteries according to the present invention.

In the electrode for lithium ion batteries of the present invention, including the embodiments illustrated in FIGS. 2 to 6, the proportion by volume of the conductive member (A) is preferably 0.1 to 15 vol %, more preferably 1 to 6 vol %, based on the volume of the electrode. In other words, the volume of the conductive member (A) in the electrode is preferably relatively small. A small volume of the conductive member (A) indicates that voids not occupied by the conductive member (A) can be filled with a large number of active material particles (B). By filling the voids with a large number of active material particles (B), an electrode for lithium ion batteries with high capacity can be obtained.

As used herein, the term "a large number of active material particles" does not mean specification of the number of active materials present in the electrode, but means that a sufficient number of active material particles to fill the voids between the first main surface and the second main surface are present.

In the electrode for lithium ion batteries of the present invention, the proportion by volume of the active material particles (B) is preferably 30 to 80 vol %, more preferably 45 to 60 vol %, based on the volume of the electrode. If the proportion of the active material particles (B) is large, the electrode for lithium ion batteries can have high capacity.

In the electrode for lithium ion batteries of the present invention, the ratio ($V_A/V_B$) of the volume $V_A$ of the conductive member (A) to the volume $V_B$ of the active material particles (B) is preferably 0.00125 to 0.5, more preferably 0.03 to 0.35.

If the volume of the conductive member (A) is small and that of the active material particles (B) is large, the electrode for lithium ion batteries can have high capacity.

The volume of the conductive member (A) and that of the active material particles (B) are determined by the following method.

An electrode containing a mixture of the conductive member (A) and the active material particles (B) is prepared by drying an electrolyte solution and the like. The weight [w (g)] per cm$^2$ of the electrode and the film thickness [t (cm)] of the electrode are measured. The volumes of the conductive member (A) and the active material particles (B) are calculated based on the weight, the thickness, the true specific gravity [dA (g/cm$^3$)] of the conductive member (A), the true specific gravity [dB (g/cm$^3$)] of the active material particles (B), and the proportions (WA and WB) of the conductive member (A) and the active material particles (B) added based on the total weight of the components constituting the electrode of the present invention.

$V_A=(w \times WA/dA)/(t \times 1) \times 100$
$V_B=(w \times WB/dB)/(t \times 1) \times 100$ The method of producing the electrode for lithium ion batteries of the present invention will be described below.

One aspect of the present invention provides a method of producing the electrode for lithium ion batteries of the present invention, the method including: step (P1) of providing a structure (Z) that contains the conductive member (A), has voids therein, and has a first main surface and a second main surface; step (P2) of applying a slurry (X) containing the active material particles (B) to the first main surface or the second main surface of the structure (Z); and step (P3) of filling the voids in the structure (Z) with the active material particles (B) by pressurization or depressurization.

The production method according to this aspect is suitable for producing the electrodes for lithium ion battery according to the embodiments illustrated in FIG. 2, FIG. 3, and FIG. 6.

First, a structure (Z) is provided (step P1). The structure (Z) includes the conductive member (A), has voids therein, and has a first main surface and a second main surface.

The structure (Z) has a large number of voids. The term "void" as used herein refers to space that has an opening and is surrounded by the materials constituting the structure (conductive fibers or resin provided with conductivity). The voids have no clear boundaries therebetween, and are joined to each other. Accordingly, the term "a large number of voids" does not mean counting the number of voids in the structure (Z) to specify the number of voids, but means that voids for being filled with active material particles occupy a large volume in the structure (Z) and that the structure (Z) has space that can be filled with a large number of active material particles.

The structure (Z) is preferably a nonwoven fabric including the conductive member (A) made of conductive fibers, a woven fabric or knitted fabric including the conductive member (A) made of conductive fibers, or a foamed resin including the conductive member (A) made of a resin provided with conductivity. The descriptions of the nonwoven fabric, woven fabric, knitted fabric, and foamed resin are the same as those for the electrode for lithium ion batteries of the present invention, and thus are omitted here.

Figure 7A:
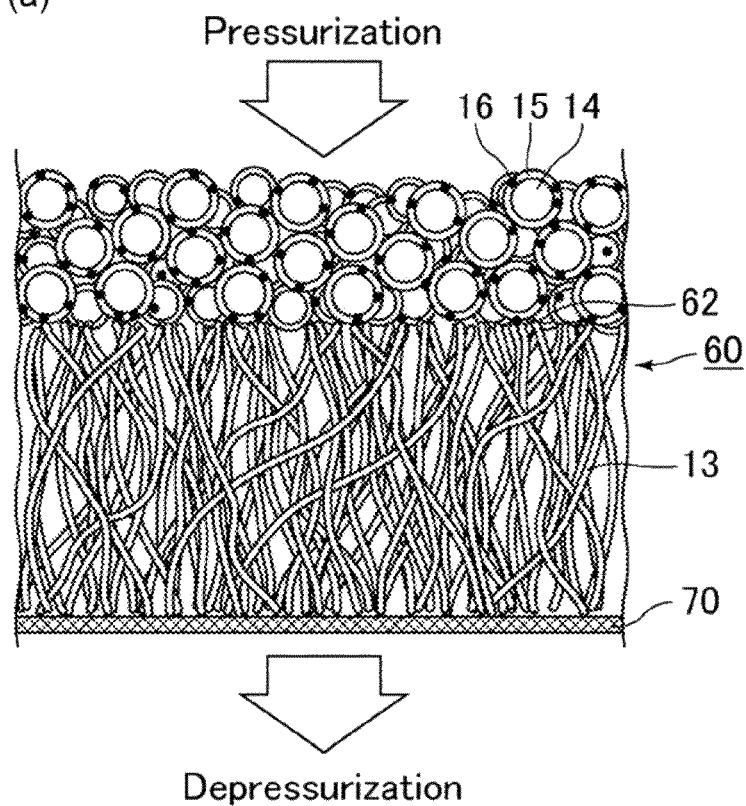
FIG. 7(a) and FIG. 7(b) schematically illustrates a step of filling voids in a structure with active material particles.
Figure 7B:
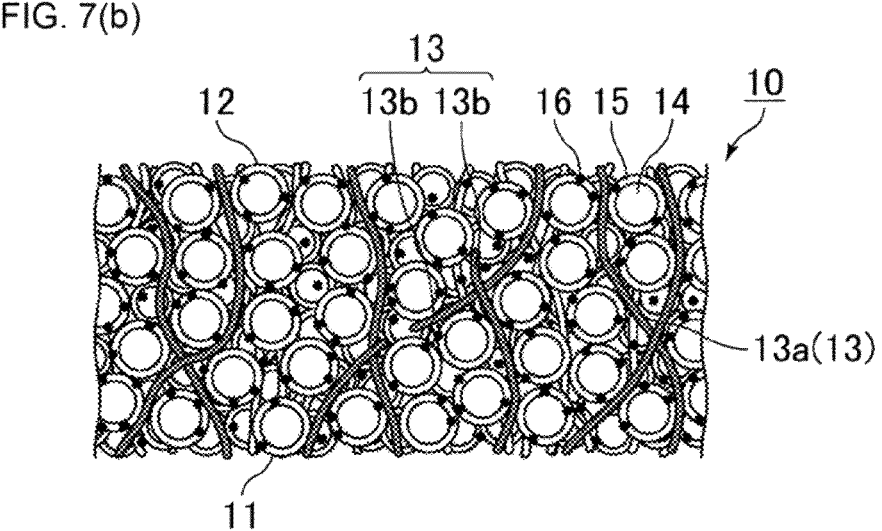

FIG. 7(a) and FIG. 7(b) illustrates a step of filling voids in a structure with active material particles. These figures illustrate an embodiment where the structure is a nonwoven fabric.

Next, a slurry (X) containing the active material particles (B) is applied to the first main surface or the second main surface of the structure (Z) (step P2).

The active material particles (B) may be any of those mentioned in the description of the electrode for lithium ion batteries of the present invention. The active material particles (B) are preferably coated active material particles. The coated active material particles can be obtained as follows, for example. Particles of a lithium ion battery active material are fed into a universal mixer. While stirring at 30 to 500 rpm, a resin solution containing a resin for coating the lithium ion battery active material is added dropwise over 1 to 90 minutes, and further a conductive additive is added. While stirring continues, the temperature is raised to 50° C. to 200° C. After the pressure decreases to 0.007 to 0.04 MPa, the mixture is held for 10 to 150 minutes, whereby coated active material particles are obtained.

The slurry containing the active material particles (B) is preferably a solvent slurry (X1) containing a solvent (C) or an electrolyte solution slurry (X2) containing an electrolyte solution (D).

Examples of the solvent (C) include water, 1-methyl-2-pyrrolidone (N-methylpyrrolidone), methyl ethyl ketone, dimethylformamide, dimethylacetamide, N,N-dimethylaminopropylamine, and tetrahydrofuran.

The electrolyte solution (D) may be an electrolyte solution containing an electrolyte and a nonaqueous solvent and usable for producing lithium ion batteries.

An electrolyte that is used for usual electrolyte solutions may be used. Examples thereof include lithium salts of inorganic acids such as $LiPF_6$, $LiBF_4$, $LiSbF_6$, $LiAsF_6$, and $LiClO_4$ and lithium salts of organic acids such as $LiN(CF_3SO_2)_2$, $LiN(C_2F_5SO_2)_2$, and $LiC(CF_3SO_2)_3$. From the viewpoint of the output power of the battery and the charge-discharge cycle characteristics, $LiPF_6$ is preferred.

A nonaqueous solvent that is used for usual electrolyte solutions may be used. Examples thereof include lactone compounds, cyclic or acyclic carbonates, acyclic carboxylic acid esters, cyclic or acyclic ethers, phosphoric acid esters, nitrile compounds, amide compounds, sulfone, sulfolane, and mixtures thereof.

The nonaqueous solvents may be used alone or in combination of two or more.

Among the nonaqueous solvents, lactone compounds, cyclic carbonates, acyclic carbonates, and phosphates are preferred from the viewpoint of the output power of the battery and the charge-discharge cycle characteristics. Lactone compounds, cyclic carbonates, and acyclic carbonates are more preferred. Mixtures of cyclic carbonates and acyclic carbonates are still more preferred. A mixture of ethylene carbonate (EC) and diethyl carbonate (DEC) is particularly preferred.

The slurry (X) is preferably prepared by dispersing and slurrying the active material particles (B) and optionally a conductive additive and a binder at a concentration of 10 to 60% by weight based on the weight of the solvent or the electrolyte solution.

The conductive additive may be any of those mentioned in the description of the electrode for lithium ion batteries of the present invention.

Examples of the binder include polymer compounds such as starch, polyvinylidene fluoride, polyvinyl alcohol, carboxymethyl cellulose, polyvinylpyrolidone, tetrafluoroethylene, styrene-butadiene rubber, polyethylene, and polypropylene.

The slurry containing the active material particles (B) can be applied to the first main surface or the second main surface of the structure (Z) with any application device. Examples thereof include a bar coater and a brush.

FIG. 7(a) schematically illustrates a slurry applied to a second main surface of a nonwoven fabric as a structure. A slurry containing positive electrode active material particles 14 is applied to a second main surface 62 of a nonwoven fabric 60.

Then, the voids in the structure (Z) are filled with the active material particles (B) by pressurization or depressurization (step P3).

The pressurization may be performed by pressing from above the surface with the slurry using a pressing machine. The depressurization may be performed by suction using a vacuum pump with filter paper or mesh applied to the surface of the structure to which the slurry is not applied.

The structure (Z) has voids. By the pressurization or depressurization, the voids in the structure (X) can be filled with the active material particles (B).

FIG. 7(a) shows an arrow indicating the direction of pressurization from above a surface with a slurry and an arrow indicating the direction of depressurization from below filter paper 70. FIG. 7(b) illustrates an electrode 10 for lithium ion batteries in which voids in the structure (Z) are filled with the active material particles (B). The electrode for lithium ion batteries illustrated in FIG. 7(b) is the same as the electrode 10 for lithium ion batteries illustrated in FIG. 2.

If the slurry containing the active material particles (B) is a solvent slurry (X1) containing a solvent (C), step (P4) of removing the solvent (C) is further preferably performed after step (P3).

If the slurry containing the active material particles (B) is an electrolyte solution slurry (X2) containing an electrolyte solution (D), the voids in the structure (Z) are filled with the active material particles (B) and the electrolyte solution (D). Such a configuration is preferable as an electrode for lithium ion batteries.

The use of the electrolyte solution slurry is preferred because unlike the use of the solvent slurry, it does not cause mixing of impurities other than the electrolyte solution into the liquid component in the electrode for lithium ion batteries.

Also in the case where the structure (Z) is not a nonwoven fabric but a woven fabric or knitted fabric containing the conductive member (A) or a foamed resin including a resin provided with conductivity, an electrode for lithium ion batteries can be produced by filling the active material particles into the voids in the structure by the above step.

Another aspect of the present invention provides a method of producing the electrode for lithium ion batteries of the present invention, the method including: step (Q1) of applying a slurry (Y) containing the conductive member (A) and the active material particles (B) to a film (E); and step (Q2) of fixing the active material particles (B) and the conductive member (A) onto the film (E) by pressurization or depressurization.

The method according to this aspect is suitable for producing the electrode for lithium ion batteries according to the embodiment illustrated in FIG. 4. In particular, this method is suitable for producing a positive electrode for lithium ion batteries.

Figure 8A:
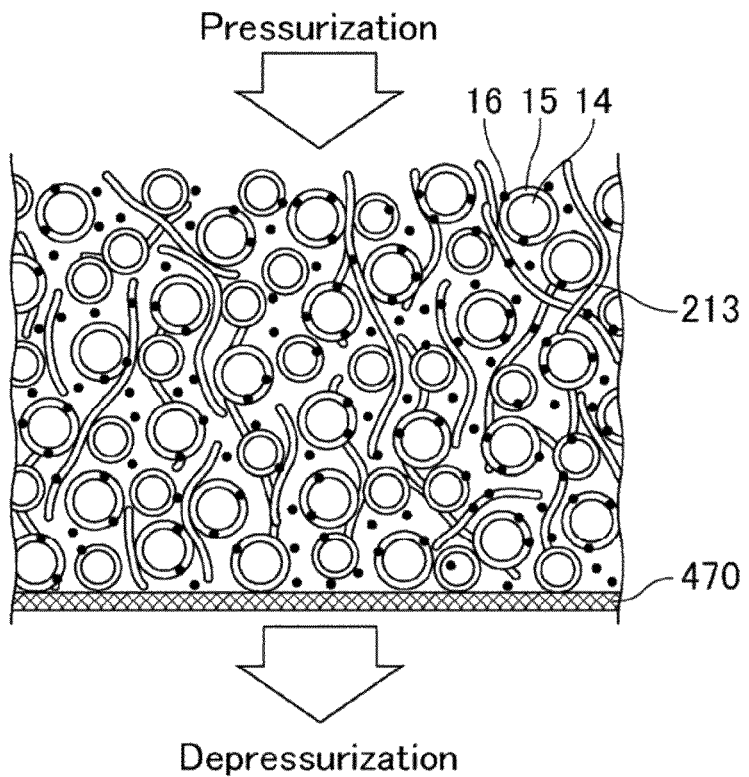
FIG. 8(a) and FIG. 8(b) schematically illustrates a step of fixing active material particles and a conductive member onto a film.
Figure 8B:
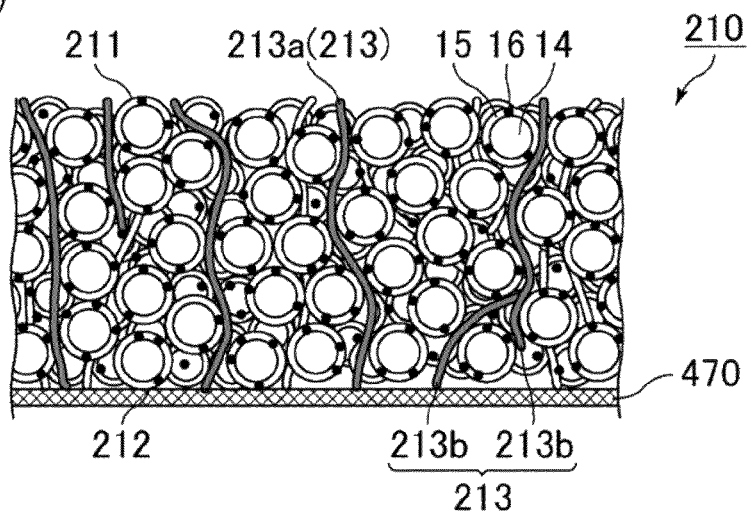

FIG. 8(a) and FIG. 8(b) schematically illustrates a step of fixing active material particles and a conductive member onto a film.

First, the slurry (Y) containing the conductive member (A) and the active material particles (B) is applied to a film (E) (step Q1).

The slurry (Y) may be, for example, a slurry obtained by further dispersing conductive fibers as the conductive member (A) into the slurry (X) described above.

The conductive fibers may be any of the conductive fibers described for the electrode for lithium ion batteries of the present invention. The conductive fibers are preferably independent from one another. They preferably do not have a three-dimensional structure such as a nonwoven fabric, a woven fabric, or a knitted fabric. If the conductive fibers are independent from one another, the fibers are dispersed in the slurry.

The slurry (Y) is preferably an electrolyte solution slurry (Y1) containing an electrolyte solution (D). The electrolyte solution (D) may be the same as the electrolyte solution (D) for the electrolyte solution slurry (X2) described above. The slurry (Y) may be a solvent slurry containing a solvent (C).

The film (E) is preferably a film capable of separating the active material particles and the conductive member from the electrolyte solution and the solvent in the subsequent pressurization or depressurization step. If the film (E) is made of a material having high conductivity (conductive material), the film (E) can substitute for the current collector. In addition, the conductivity is not inhibited even if the film (E) contacts with the current collector. Thus, the film is preferably made of a conductive material. For example, the film (E) is suitably made of a material with an electrical conductivity of 100 mS/cm or more.

Examples of materials with such properties include filter paper containing conductive fibers such as carbon fibers and metal mesh.

The metal mesh is preferably made of stainless steel. Examples of such a metal mesh include SUS316-made twilled dutch weave wire mesh (available from Sunnet Industrial Co., Ltd.). The metal mesh preferably has an opening size that does not allow the active material particles or the conductive member to pass through the mesh. For example, a metal mesh of 2300 mesh is preferably used.

The slurry (Y) can be applied to the film (E) with any application device. Examples thereof include a bar coater and a brush.

FIG. 8(a) schematically illustrates a slurry applied to a film. A slurry containing active material particles 14 and conductive fibers 213 is applied to a filter paper 470 as a film.

Next, the active material particles (B) and the conductive member (A) are fixed onto the film (E) by pressurization or depressurization (step Q2).

The pressurization or the depressurization can be performed in the same manner as in step (P3). By the pressurization or depressurization, the electrolyte solution or the solvent is removed from the slurry (Y), and the conductive fibers as the conductive member (A) and the active material particles (B) are fixed onto the film (E) such that the fixed shape is retained loosely to the extent that they do not flow.

FIG. 8(b) illustrates an electrode 210 in which the conductive fibers 213 as the conductive member (A) and the active material particles 14 are fixed on the filter paper 470.

If the film (E) in the electrode 210 is made of a conductive material, the film (E) can substitute for a current collector. Alternatively, the film (E) and a current collector may be brought into contact so that they can serve as one current collector. Accordingly, a second main surface 212 in the electrode 210 can be defined as a portion where the conductive fibers 213 as the conductive member (A) contact with the filter paper 470.

If the film (E) is made of a non-conductive material, the film (E) is preferably disposed on the separator side. Alternatively, the film (E) may be used as a separator. Examples of the film made of a non-conductive material include an aramid separator (available from Japan Vilene Company, Ltd.).

If the slurry (Y) is an electrolyte solution slurry (Y1) containing an electrolyte solution (D), the film (E) is preferably a film impermeable to the active material particles (B) but permeable to the electrolyte solution (D), and the electrolyte solution (D) is preferably allowed to permeate the film (E) by pressurization or depressurization so as to be removed in step (Q2).

A press step (Q3) of pressurizing the slurry (Y) at a higher pressure is preferably performed after step (Q2).

In the press step (Q3), the pressure difference is greater than that in the pressurization or depressurization in step (Q2) in order to improve the density of the active material particles (B). The "press step (Q3)" encompasses both pressurization in the case where depressurization is performed in step (Q2) and pressurization at a higher pressure in the case where pressurization is performed in step (Q2).

It is preferred to further perform step (Q4) of transferring the electrode for lithium ion batteries fixed onto the film (E) to a main surface of a current collector or a separator so as to produce an electrode for lithium ion batteries having a first main surface thereof on the main surface of the separator or produce an electrode for lithium ion batteries having a second main surface thereof on the main surface on the current collector.

If step (Q4) is performed, the electrode for lithium ion batteries fixed onto the film (E) is preferably transferred by bringing a main surface [first main surface 211 in FIG. 8(b)] of the electrode opposite the film (E) into contact with a main surface of a current collector or a separator.

If the film (E) is made of a conductive material and substitutes for a current collector, the electrode is preferably transferred by bringing a main surface opposite the film (E) into contact with a main surface of a separator. If the film (E) does not substitute for a current collector, a step of removing the film (E) is preferably performed after step (Q4).

Yet another aspect of the present invention provides a method of producing the electrode for lithium ion batteries of the present invention, the method including: step (T1) of applying a slurry (Y) containing the conductive member (A) and the active material particles (B) to a current collector to form a slurry layer on the current collector; and step (T2) of disposing a separator on the slurry layer and absorbing liquid from an upper surface of the separator so as to fix the active material particles (B) and the conductive member (A) between the current collector and the separator.

The method according to this aspect is suitable for producing the electrode for lithium ion batteries according to the embodiment described with reference to FIG. 4, where the conductive member includes conductive fibers dispersed between the first main surface and the second main surface. In particular, the method is suitable for producing a negative electrode for lithium ion batteries.

Figure 9A:
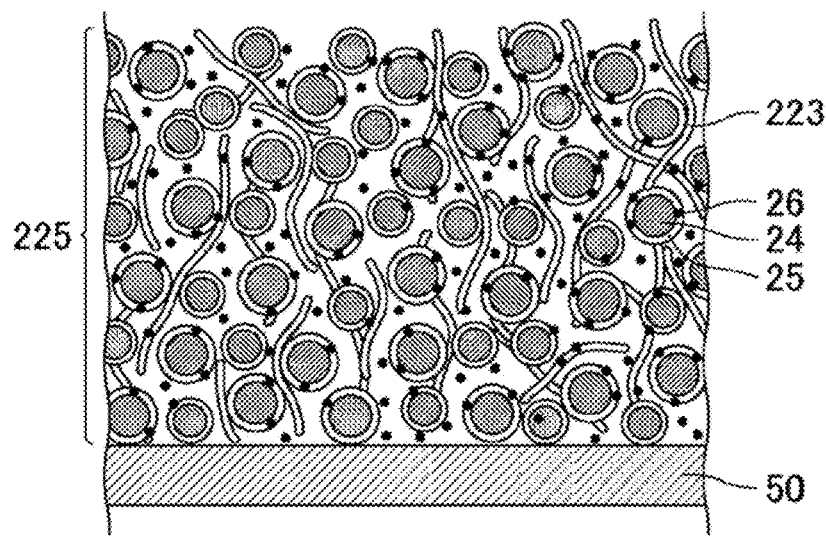
FIG. 9(a), FIG. 9(b) and FIG. 9(c) schematically illustrates a step of fixing active material particles and a conductive member between a current collector and separator.
Figure 9B:
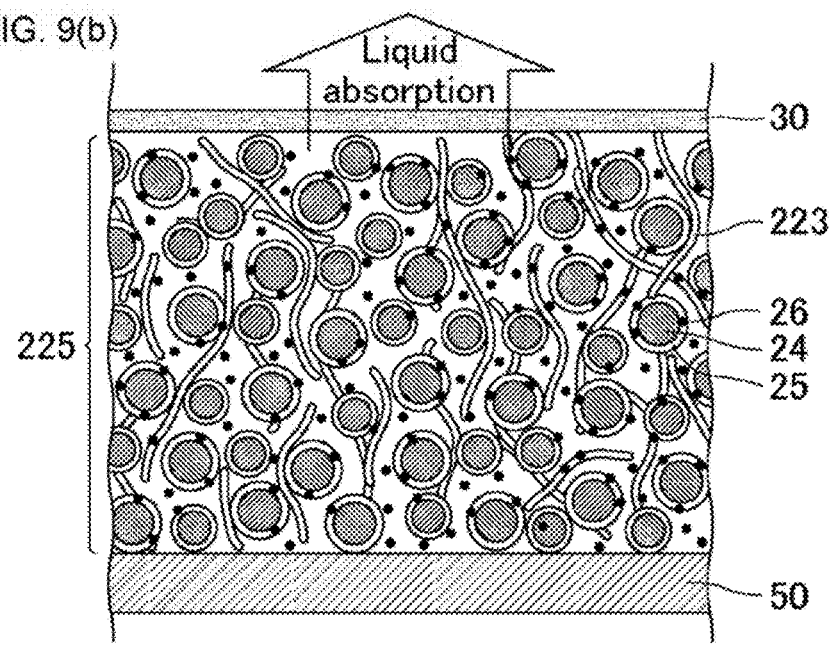
Figure 9C:
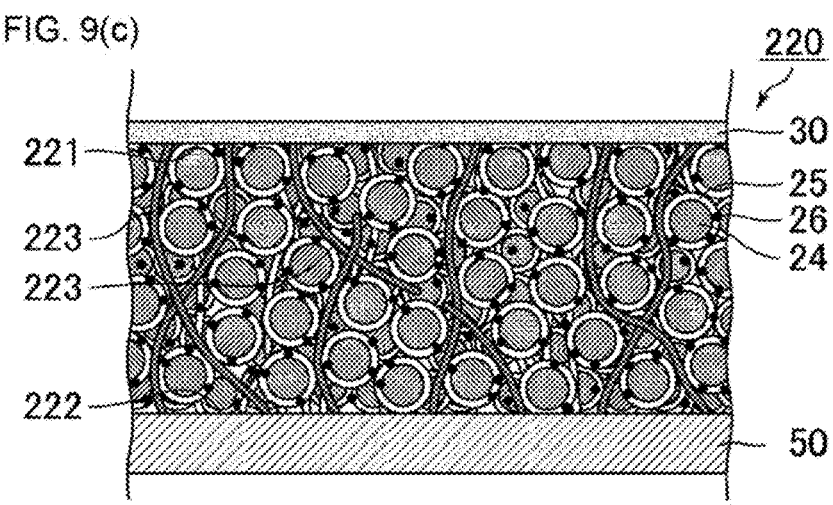

FIG. 9(a), FIG. 9(b) and FIG. 9(c) schematically illustrates a step of fixing active material particles and a conductive member between a current collector and a separator.

First, a slurry (Y) containing the conductive member (A) and the active material particles (B) is applied to a current collector so as to form a slurry layer (step T1).

The current collector may be, for example, copper, aluminum, titanium, stainless steel, nickel, baked carbon, conductive polymer, or conductive glass.

The slurry (Y) may be the same as the slurry (Y) described above with reference to FIG. 8. Examples thereof include a slurry obtained by further dispersing conductive fibers as the conductive member (A) into the slurry (X).

The slurry (Y) is preferably an electrolyte solution slurry (Y1) containing an electrolyte solution (D). The electrolyte solution (D) may be the same as the electrolyte solution (D) described above for the electrolyte solution slurry (X2). The slurry (Y) may be a solvent slurry containing a solvent (C).

The slurry (Y) can be applied to the current collector with any application device. Examples thereof include a bar coater and a brush.

FIG. 9(a) schematically illustrates a slurry layer 225 formed by applying a slurry to a current collector 50. A slurry containing negative electrode active material particles 24 and conductive fibers 223 is applied to the current collector 50. The applied slurry forms the slurry layer 225.

In the embodiment illustrated in FIG. 9(a), the negative electrode active material particles 24 are coated with a coating agent 25. The slurry contains a conductive additive 26.

The conductive fibers 223, the coating agent 25, and the conductive additive 26 are the same as the conductive fibers 213, the coating agent 15, and the conductive additive 16 described above for the electrode (positive electrode) for lithium ion batteries of the present invention.

Also, the negative electrode active material particles 24 are the same as the negative electrode active material particles described for the electrode for lithium ion batteries of the present invention.

Next, a separator is disposed on the slurry layer, and liquid is absorbed from the upper surface of the separator so as to fix the active material particles (B) and the conductive member (A) between the current collector and the separator (step T2). As illustrated in FIG. 9(b), a separator 30 is disposed on a slurry layer 225, and then liquid is absorbed from the upper surface of the separator 30.

Examples of the separator include aramid separators (available from Japan Vilene Company, Ltd.), microporous polyethylene films, microporous polypropylene films, multilayer films composed of a porous polyethylene film and a porous polypropylene film, nonwoven fabrics containing polyester fibers, aramid fibers, or glass fibers, and separators containing ceramic microparticles such as silica, alumina, or titania particles attached to the surface of any of these films or nonwoven fabrics.

The liquid absorption may be performed as follows: Pressurization from the upper surface or the lower surface of the separator is performed to allow liquid to exude from the upper surface of the separator, and the exuded liquid is absorbed. Or, the liquid absorption may be performed by depressurization from the upper surface of the separator to suction liquid. Alternatively, the liquid absorption may be performed from the upper surface of the separator by disposing a liquid-absorbing material on the upper surface of the separator.

The liquid-absorbing material may be liquid-absorbing cloth such as towel, paper, or a liquid-absorbing resin.

By absorption of liquid, the electrolyte solution or the solvent is removed from the slurry (Y). The conductive fibers as the conductive member (A) and the active material particles (B) are thus fixed between the current collector and the separator so that the fixed shape is retained loosely to the extent that they do not flow.

The pressurization may be performed by any method. Various methods may be employed. Examples thereof include pressurization with a known pressing machine and pressurization by disposing a heavy material as a weight. During pressurization, vibrations may be applied with an ultrasonic vibrator or the like. The pressure in the pressurization from the upper surface or the lower surface of the separator is preferably 0.8 to 41 kg/cm$^2$, more preferably 0.9 to 10 kg/cm$^2$. If the pressure is within this range, the conductive paths inside the electrode can be favorably formed, which advantageously increases the capacity of a battery.

FIG. 9(c) illustrates an electrode 220 in which conductive fibers 223 as the conductive member (A) and the active material particles 24 are fixed between a current collector 50 and a separator 30.

In the electrode 220, a first main surface 221 of the electrode is in contact with a separator 30. A second main surface 222 of the electrode is in contact with a current collector 50.

Such a method of producing an electrode for lithium ion batteries produces an electrode sandwiched between a separator and a current collector. Such a method is preferred because it eliminates the need for an additional step of disposing a separator and a current collector on both sides of the electrode, and enables the production of an electrode with a structure preferred for a bipolar electrode in fewer steps.

Another aspect of the present invention provides a method of producing an electrode for lithium ion batteries, the electrode including: a first main surface to be located adjacent to a separator of a lithium ion battery; and a second main surface to be located adjacent to a current collector of the lithium ion battery, wherein the electrode contains, between the first main surface and the second main surface, a conductive member (A) made of an electronically conductive material, a large number of active material particles (B), and a resin (F), at least part of the conductive member (A) forms a conductive path that electrically connects the first main surface to the second main surface, and the conductive path is in contact with the active material particles (B) around the conductive path, the method including step (R1) of hot-pressing a composition for an electrode containing the conductive member (A), the active material particles (B), and the resin (F) so as to fix the conductive member (A) and the active material particles (B) by the resin (F).

The method according to the above aspect is suitable for producing the electrode for lithium ion batteries according to the embodiment described with reference to FIG. 5.

Figure 10A:
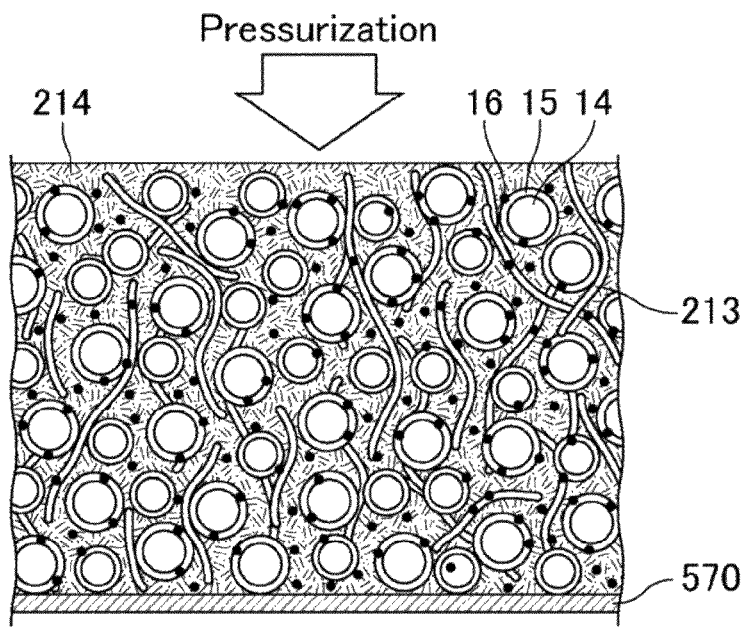
FIG. 10(a) and FIG. 10(b) schematically illustrates a step of fixing active material particles and a conductive member by a resin.
Figure 10B:
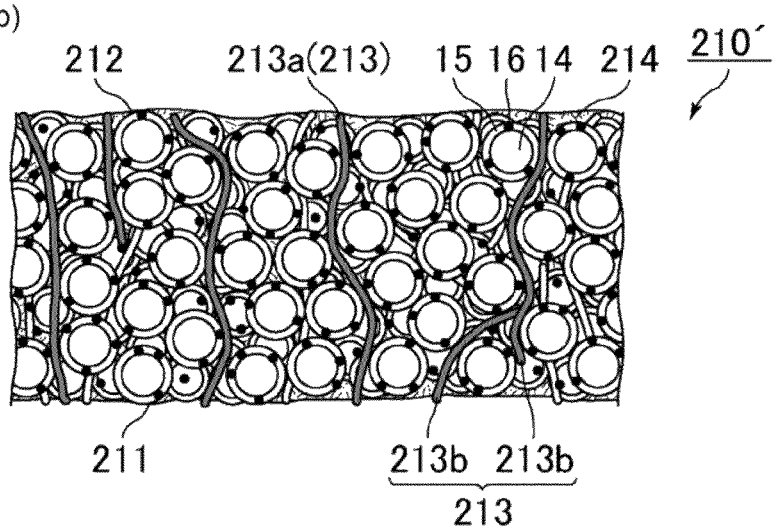

FIG. 10(a) and FIG. 10(b) schematically illustrates a step of fixing active material particles and a conductive member by a resin.

First, a composition for an electrode is prepared which contains a conductive member (A), active material particles (B), and a resin (F).

The conductive member (A) preferably includes conductive fibers that are independent from one another, as in the case of the conductive member (A) preferred for the method of producing the electrode for lithium ion batteries according to the aspect described with reference to FIG. 8(a) and FIG. 8(b)

Preferred examples of the resin (F) include vinyl resins, urethane resins, polyester resins, and polyamide resins. These resins are preferred from the viewpoint of moldability.

In the composition for an electrode, the resin (F) may be in the form of a resin solution in a solvent or in the form of solid, such as a pellet that is fluidized when heated.

If the active material particles (B) are coated active material particles, the coating resin contained in the coating agent may be the resin (F).

If the resin (F) in the composition for an electrode is in the form of a resin solution in a solvent, the conductive member (A) and the active material particles (B) are preferably dispersed in the resin solution. Also in the case where the resin (F) is in the form of solid, the resin (F), the conductive member (A), and the active material particles (B) are preferably dispersed, not localized in a particular portion.

The composition for an electrode thus prepared is hot-pressed so that the conductive member (A) and the active material particles (B) are fixed by the resin (F) (step R1).

The composition may be hot-pressed by any method. For example, the composition may be hot-pressed by a method in which, as illustrated in FIG. 10(a), a composition for an electrode containing positive electrode active material particles 14, conductive fibers 213, a resin 214 is applied to a plate 570 such as a metal plate and then hot-pressed from the upper surface.

The composition for an electrode may be applied by any application device. Examples thereof include a bar coater or a brush. The hot-pressing may be performed using a usual hot-pressing device.

In the case where the resin (F) is the coating resin of the coated active material particles, when the conductive member (A) and the coated active material particles are applied to a plate and hot-pressed, the conductive member and the (coated) active material particles are fixed by coating resin melted by heat.

The active material particles fixed by the coating resin may be coated active material particles that remains coated with the coating resin or may be active material particles from which the coating has peeled off.

The conditions for the hot-pressing may be determined according to the curing conditions of the resin to be used and are not limited. For urethane resin, for example, the hot-pressing is preferably performed at 100° C. to 200° C. and 0.01 to 5 MPa for 5 to 300 seconds.

For vinyl resin, the hot-pressing may be performed at 80° C. to 180° C. and 0.01 to 5 MPa for 5 to 300 seconds.

By hot-pressing, as illustrated in FIG. 10(b), an electrode 210' in which conductive fibers 213 and positive electrode active material particles 14 are fixed by a resin 214 can be produced.

A lithium ion battery including the electrode for lithium ion batteries of the present invention can be obtained by assembling the electrode of the present invention with a counter electrode, placing the assembly, together with a separator, into a cell case, pouring an electrolyte solution to the case, and sealing the case.

Alternatively, such a lithium ion battery can be obtained by forming a positive electrode on one surface of a current collector and a negative electrode on the other surface to produce a bipolar electrode, stacking the bipolar electrode on a separator, placing the stack into a cell case, pouring an electrolyte solution, and sealing the cell case.

In the lithium ion battery, either one of the positive electrode and the negative electrode may be the electrode for lithium ion batteries of the present invention, or both of the positive electrode and the negative electrode may be the electrode for lithium ion batteries of the present invention.

Examples of the separator include microporous polyethylene films, microporous polypropylene films, multi-layer films composed of a porous polyethylene film and a porous polypropylene film, nonwoven fabrics made of polyester fibers, aramid fibers, or glass fibers, and separators containing ceramic microparticles such as silica, alumina, or titania particles attached to the surface of any of these films or nonwoven fabrics.

The electrolyte solution may be the electrolyte solution described above as the electrolyte solution (D).

EXAMPLES

The present invention will be specifically described below based on examples. The present invention is not limited to the examples, as long as it does not departs from the scope of the present invention. The "part(s)" refers to part(s) by weight and "%" refers to % by weight, if not otherwise specified.

<Preparation of Coating Resin Solution>

A four-necked flask equipped with a stirring device, a thermometer, a reflux condenser, a dropping funnel, and a nitrogen gas injection tube was charged with 83 parts of ethyl acetate and 17 parts of methanol. The temperature was then raised to 68° C. Subsequently, a monomer mixture containing 242.8 parts of methacrylic acid, 97.1 parts of methyl methacrylate, 242.8 parts of 2-ethylhexyl methacrylate, 52.1 parts of ethyl acetate, and 10.7 parts of methanol and an initiator solution containing 0.263 parts of 2,2'-azobis(2,4-dimethylvaleronitrile) dissolved in 34.2 parts of ethyl acetate were added dropwise through the dropping funnel continuously over four hours under stirring, while blowing nitrogen into the four-necked flask. Thus, radical polymerization was performed. After the completion of the dropwise addition, an initiator solution containing 0.583 parts of 2,2'-azobis(2,4-dimethylvaleronitrile) in 26 parts of ethyl acetate was continuously added over two hours through the dropping funnel. The polymerization was further continued at the boiling point for four hours. The solvent was removed and 582 parts of a resin was obtained. Thereafter, 1,360 parts of isopropanol was added to the resin, so that a coating resin solution containing a vinyl resin was obtained. The coating resin solution had a resin concentration of 30% by weight.

<Pulverization of Positive Electrode Active Material Particles>

An amount of 100 parts by weight of $LiCoO_2$ powder [available from Nippon Chemical Industrial Co., Ltd., CELLSEED C-5H], 100 parts by weight of water, and 1200 parts by weight of alumina balls (Φ3 mm) were put in a pot mill and the powder was pulverized for 20 minutes. Thus, 100 parts by weight of $LiCoO_2$ powder with an average particle size of 2.3 μm was obtained.

<Pulverization of Negative Electrode Active Material Particles>

An amount of 100 parts by weight of non-graphitizable carbon [available from Kureha Battery Materials Japan Co., Ltd., CARBOTRON (registered trademark) PS(F)], 200 parts by weight of water, and 1000 parts by weight of zirconia balls (Φ0.1 mm) were put in a pot mill and the carbon was pulverized for 15 minutes. Thus, 100 parts by weight of non-graphitizable carbon with an average particle size of 2.5 μm was obtained.

<Preparation of Coated Positive Electrode Active Material Particles (B-1)>

An amount of 96 parts by weight of $LiCoO_2$ powder [available from Nippon Chemical Industrial Co., Ltd., CELLSEED C-8G] was put into a universal mixer. While stirring at 150 rpm at room temperature, the coating resin solution (resin solid concentration: 30% by weight) was added dropwise over 60 minutes such that the amount of the resin solid added was 2 parts by weight. The resulting mixture was further stirred for 30 minutes.

Subsequently, while stirring, 2 parts by weight of acetylene black [available from Denka Company Limited., DENKA BLACK (registered trademark)] was added to the mixture in three steps. The temperature was raised to 70° C. while stirring for 30 minutes. The pressure was reduced to 100 mmHg and the mixture was held for 30 minutes. In this manner, coated positive electrode active material particles (B-1) were obtained.

<Preparation of Coated Positive Electrode Active Material Particles (B-2)>

Coated positive electrode active material particles (B-2) were obtained in the same manner as in the preparation of (B-1) except that the 96 parts by weight of $LiCoO_2$ powder [available from Nippon Chemical Industrial Co., Ltd., CELLSEED C-8G] was changed to the $LiCoO_2$ powder with an average particle size of 2.3 μm obtained in <Pulverization of positive electrode active material particles> described above.

<Preparation of Coated Negative Electrode Active Material Particles (B-3)>

An amount of 90 parts by weight of non-graphitizable carbon [available from Kureha Battery Materials Japan Co., Ltd., CARBOTRON (registered trademark) PS(F)] was put into a universal mixer. While stirring at 150 rpm at room temperature, the coating resin solution (resin solid concentration: 30% by weight) was added dropwise over 60 minutes such that the amount of resin solid added was 5 parts by weight. The resulting mixture was further stirred for 30 minutes.

Subsequently, while stirring, 5 parts by weight of acetylene black [available from Denka Company Limited., DENKA BLACK (registered trademark)] was added to the mixture in three steps. The temperature was raised to 70° C. while stirring for 30 minutes. The pressure was reduced to 0.01 MPa and the mixture was held for 30 minutes. In this manner, coated negative electrode active material particles (B-3) were obtained.

<Preparation of Coated Negative Electrode Active Material Particles (B-4)>

Coated negative electrode active material particles (B-4) were obtained in the same manner as in the preparation of (B-3) except that the 90 parts by weight of non-graphitizable carbon [available from Kureha Battery Materials Japan Co., Ltd., CARBOTRON (registered trademark) PS(F)] was changed to 90 parts by weight of the non-graphitizable carbon with average particle size of 2.5 µm obtained in <Pulverization of negative electrode active material particles> described above.

<Preparation of Carbon Fibers (C)>

Carbon fibers (C) were prepared with reference to the method disclosed in Eiichi Yasuda, Asao Oya, Shinya Komura, Shigeki Tomonoh, Takashi Nishizawa, Shinsuke Nagata, Takashi Akatsu, CARBON, 50, 2012, pp. 1432-1434 and Eiichi Yasuda, Takashi Akatsu, Yasuhiro Tanabe, Kazumasa Nakamura, Yasuto Hoshikawa, Naoya Miyajima, TANSO, 255, 2012, pp. 254-265.

An amount of 10 parts by weight of synthetic mesophase pitch AR·MPH [available from Mitsubishi Gas Chemical Company, Inc.] as a carbon precursor and 90 parts by weight of polymethylpentene TPX RT18 [available from Mitsui Chemicals, Inc.] were melt-kneaded at a barrel temperature of 310° C. under nitrogen atmosphere using a single-screw extruder. Thus, a resin composition was prepared.

The resin composition was melt-extruded and spun at 390° C. The spun resin composition was put in an electric furnace and held at 270° C. under nitrogen atmosphere for three hours, so that the carbon precursor was stabilized. Subsequently, the temperature of the electric furnace was raised to 500° C. over one hour and the spun composition was held at 500° C. for one hour, so that the polymethylpentene was decomposed and removed. The temperature of the electric furnace was raised to 1000° C. over two hours, and the remaining stabilized carbon precursor was held at 1000° C. for 30 minutes, so that it was converted into conductive fibers.

An amount of 90 parts by weight of the obtained conductive fibers, 500 parts by weight of water, and 1000 parts by weight of zirconia balls (Φ0.1 mm) were put into a pot mill and the conductive fibers were pulverized for five minutes. The zirconia balls were removed by classification and then the conductive fibers were dried at 100° C. Thus, conductive carbon fibers (C) were obtained.

Measurement with a SEM showed that the fibers had an average fiber diameter of 0.9 µm and an average fiber length of 25 µm.

<Preparation of Electrolyte Solution>

$LiPF_6$ was dissolved in a mixed solvent of ethylene carbonate (EC) and diethyl carbonate (DEC) (volume ratio: 1:1) at 1 mol/L. Thus, an electrolyte solution for lithium ion batteries was prepared.

Example 1

Urethane foam that was nickel-plated and thus provided with conductivity [available from Seiren, Co., Ltd., Sui-70-5005, thickness: 450 µm, electrical conductivity: 300 mS/cm] was provided. The urethane foam is a structure (Z) including a resin provided with conductivity as a conductive member (A), has a large number of voids, and has a first main surface and a second main surface.

Separately, 85.5 parts by weight of $LiCoO_2$ powder [available from Nippon Chemical Industrial Co., Ltd., CELL-SEED C-8G] as positive electrode active material particles and 4.75 parts by weight of acetylene black [available from Denka Company Limited., DENKA BLACK (registered trademark)] were mixed with a solution of 4.75 parts by weight of polyvinylidene fluoride (available from Sigma-Aldrich) in N-methylpyrrolidone (hereinafter NMP). Thus, a solvent slurry was prepared.

The solvent slurry in such an amount that the weight of the components in the solvent slurry other than NMP was 95 parts by weight was applied to one main surface of 5 parts by weight of the urethane foam. Pressurization from above the surface with the solvent slurry was performed at a pressure of 2.0 kg/cm$^2$, so that the voids in the urethane foam were filled with the positive electrode active material particles. Thereafter, the workpiece was dried at 80° C. for 120 minutes at normal pressure to remove the solvent, and then dried at 80° C. for eight hours under reduced pressure. Thus, a positive electrode for lithium ion batteries was prepared.

Example 2

The coated positive electrode active material particles (B-1) were mixed with the above electrolyte solution to prepare an electrolyte solution slurry.

An amount of 5 parts by weight of the same urethane foam as that in Example 1 was provided. The electrolyte solution slurry in such an amount that the weight of the coated positive electrode active material particles was 95 parts by weight was applied to one main surface of the urethane foam. Pressurization from above the surface with the electrolyte solution slurry was performed at a pressure of 1.5 kg/cm$^2$, so that the voids in the urethane foam were filled with the coated positive electrode active material particles. Thus, a positive electrode for lithium ion batteries was prepared.

Example 3

An amount of 90 parts by weight of the coated positive electrode active material particles (B-1) and 5 parts by weight of acetylene black [available from Denka Company Limited., DENKA BLACK (registered trademark)] were mixed with the above electrolyte solution to prepare an electrolyte solution slurry.

An amount of 5 parts by weight of the same urethane foam as that in Example 1 was provided. The electrolyte solution slurry in such an amount that the weight of the components in the electrolyte solution slurry other than the electrolyte solution was 95 parts by weight was applied to one main surface of the urethane foam. Pressurization from above the surface with the electrolyte solution slurry was performed at a pressure of 1.5 kg/cm$^2$, so that the voids in the urethane foam were filled with the coated positive electrode active material particles. Thus, a positive electrode for lithium ion batteries was prepared.

Table 1 shows the electrode composition, the thickness, the proportions by volume of the conductive member (A) and the active material (B), and the weight per unit area of the positive electrodes for lithium ion batteries prepared in Examples 1 to 3.

TABLE 1

| | Electrode composition (wt %) | | | | Electrode | | | | | | |
|---|---|---|---|---|---|---|---|---|---|---|---|
| | Conductive member (A) | Active material (B) | | Conductive | | Proportion by volume of | Proportion by volume | Weight | Discharge | | |
| | Ni-plated urethane | Coated LCO | Binder | additive Acetylene | Thickness | conductive member (A) | of active material (B) | per unit area | capacity per weight of active material (mAh/g) | | |
| | foam | LCO | (B-1) | PVdF | black | (μm) | (vol %) | (vol %) | (mg/cm²) | 0.1 C | 0.2 C | 0.5 C | 1.0 C |
| Example 1 | 5 | 85.5 | — | 4.75 | 4.75 | 500 | 12 | 48 | 120 | 153 | 154 | 123 | 69 |
| Example 2 | 5 | — | 95 | — | — | 500 | 12 | 48 | 120 | 138 | 115 | 85 | 34 |
| Example 3 | 5 | — | 90 | — | 5 | 500 | 12 | 51 | 120 | 151 | 145 | 108 | 53 |

In the table, LCO refers to LiCoO₂ particles. Coated LCO refers to coated LiCoO₂ particles.

Example 4

Carbon fiber-made nonwoven fabric [available from Osaka Gas Chemicals Co., Ltd., DONACARBO Paper S-253, thickness: 650 μm, electrical conductivity: 400 mS/cm] was provided. The nonwoven fabric is a structure (Z) including a conductive member (A) made of conductive fibers, has a large number of voids, and has a first main surface and a second main surface. Hereinafter, the nonwoven fabric is referred to as a nonwoven fabric A.

Separately, 88 parts by weight of LiCoO₂ powder [available from Nippon Chemical Industrial Co., Ltd., CELLSEED C-8G] and 5 parts by weight of acetylene black [available from Denka Company Limited., DENKA BLACK (registered trademark)] were mixed with a solution of 5 parts by weight of polyvinylidene fluoride (available from Sigma-Aldrich) in NMP. Thus, a solvent slurry (C) was prepared.

The solvent slurry in such an amount that the weight of the components in the solvent slurry other than NMP was 98 parts by weight was applied to one main surface of 2 parts by weight of the nonwoven fabric A. Pressurization from above the surface with the solvent slurry was performed at a pressure of 2.0 kg/cm², so that the voids in the nonwoven fabric A were filled with the positive electrode active material particles. Thereafter, the workpiece was dried at 80° C. for 120 minutes at normal pressure to remove the solvent, and then dried at 80° C. for eight hours under reduced pressure. Thus, a positive electrode for lithium ion batteries was prepared.

Example 5

The same electrolyte solution slurry as that in Example 2 was prepared.

An amount of 2 parts by weight of a nonwoven fabric A, which was the same as that in Example 4, was provided. The electrolyte solution slurry in such an amount that the weight of the coated positive electrode active material particles (B-1) was 98 parts by weight was applied to one surface of the nonwoven fabric A. Pressurization from above the surface with the electrolyte solution slurry was performed at a pressure of 1.5 kg/cm², so that the voids in the nonwoven fabric A were filled with the coated positive electrode active material particles. Thus, a positive electrode for lithium ion batteries was prepared.

Example 6

Carbon fiber-made nonwoven fabric [available from Osaka Gas Chemicals Co., Ltd., DONACARBO Paper S-259P, thickness: 500 μm, electrical conductivity: 500 mS/cm] was provided. The nonwoven fabric is a structure (Z) including a conductive member (A) made of conductive fibers, has a large number of voids, and has a first main surface and a second main surface. Hereinafter, the nonwoven fabric is referred to as a nonwoven fabric B.

A positive electrode for lithium ion batteries was prepared in the same manner as in Example 4 except that the nonwoven fabric A was changed to the nonwoven fabric B.

Example 7

A positive electrode for lithium ion batteries was prepared in the same manner as in Example 5 except that the nonwoven fabric A was changed to the nonwoven fabric B.

Table 2 shows the electrode composition, the thickness, the proportions by volume of the conductive member (A) and the active material (B), and the weight per unit area of the positive electrodes for lithium ion batteries prepared in Examples 4 to 7.

TABLE 2

| | Electrode composition (wt %) | | | | | | Electrode | | | | | | |
|---|---|---|---|---|---|---|---|---|---|---|---|---|---|
| | Conductive member (A) | | Active material (B) | | Conductive | | | Proportion by volume of | Proportion by volume of active | Weight | Discharge | | | |
| | Nonwoven | Nonwoven | Coated LCO | | additive | | Thickness | conductive member (A) | material (B) | per unit area | capacity per weight of active material (mAh/g) | | | |
| | fabric A | fabric B | LCO | (B-1) | Binder PVdF | Acetylene black | (μm) | (vol %) | (vol %) | (mg/cm²) | 0.1 C | 0.2 C | 0.5 C | 1.0 C |
| Example 4 | 2 | — | 88 | — | 5 | 5 | 490 | 4 | 45 | 120 | 152 | 151 | 138 | 124 |
| Example 5 | 2 | — | — | 98 | — | — | 510 | 4 | 59 | 120 | 142 | 112 | 42 | 19 |
| Example 6 | — | 2 | 88 | — | 5 | 5 | 480 | 4 | 62 | 120 | 154 | 151 | 135 | 122 |
| Example 7 | — | 2 | — | 98 | — | — | 500 | 4 | 58 | 120 | 147 | 124 | 53 | 21 |

In the table, LCO refers to LiCoO₂ particles. Coated LCO refers to coated LiCoO₂ particles.

Example 8

Carbon fibers [available from Osaka Gas Chemicals Co., Ltd., DONACARBO Chop S-231, average fiber length: 3300 µm, average fiber diameter: 13 µm, electrical conductivity: 20 mS/cm] were provided as a conductive member (A). Hereinafter, the carbon fibers are referred to as carbon fibers A.

An amount of 1.75 parts by weight of the carbon fibers A and 98.25 parts by weight of the coated positive electrode active material particles (B-1) were mixed with the above electrolyte solution to prepare an electrolyte solution slurry.

A stainless steel mesh [available from Sunnet Industrial Co., Ltd., SUS316 twilled dutch weave, 2300 mesh] was provided as a film (E). The electrolyte solution slurry was applied to the stainless steel mesh and then subjected to suction-filtration (depressurization), so that the coated positive electrode active material particles and the carbon fibers were fixed onto the stainless steel mesh. Thus, a positive electrode for lithium ion batteries was prepared.

Example 9

The electrolyte solution slurry of the positive electrode for lithium ion batteries prepared in Example 8 was further pressurized at a pressure of 1.5 kg/cm$^2$. Thus, a positive electrode for lithium ion batteries was prepared.

Example 10

Carbon fibers [available from Osaka Gas Chemicals Co., Ltd., DONACARBO Milled S-243, average fiber length: 500 µm, average fiber diameter: 13 µm, electrical conductivity: 200 mS/cm] were provided as a conductive member (A). Hereinafter, the carbon fibers are referred to as carbon fibers B.

An amount of 1.75 parts by weight of the carbon fibers B and 98.25 parts by weight of the coated positive electrode active material particles (B-1) were mixed with the above electrolyte solution to prepare an electrolyte solution slurry.

The same stainless steel mesh as that in Example 8 was provided as a film (E). The electrolyte solution slurry was applied to the stainless steel mesh, and then subjected to suction-filtration (depressurization) while pressurizing at 1.5 kg/cm$^2$, so that the coated positive electrode active material particles and the carbon fibers were fixed onto the stainless steel mesh. Thus, a positive electrode for lithium ion batteries was prepared.

Examples 11 and 12

A positive electrode for lithium ion batteries was prepared in the same manner as in Example 10 except that the amount of electrolyte solution slurry applied was smaller than in Example 10 to reduce the thickness of the electrode.

Example 13

A positive electrode for lithium ion batteries was prepared by peeling the fixed electrode from the stainless steel mesh in Example 12.

Example 14

A mixed powder was prepared by dry-mixing 1.75 parts by weight of the carbon fibers B and 98.25 parts by weight of the coated positive electrode active material particles (B-1). The mixed powder was spread on a metal plate (iron plate) and leveled with an applicator. Thereafter, the powder was hot-pressed at 180° C. and 1.5 MPa for one minute. Thus, an electrode for lithium ion batteries was obtained in which the carbon fibers and the (coated) positive electrode active material particles were fixed by a coating resin.

The electrode was peeled from the iron plate and subjected to a discharge capacity evaluation.

Example 15

The carbon fibers (C) (average fiber length: 25 µm, average fiber diameter: 0.9 µm, electrical conductivity: 30 mS/cm) prepared in <Preparation of Carbon fibers (C)>, described above, were provided as a conductive member (A). Hereinafter, the carbon fibers are referred to as carbon fibers C.

An amount of 1 part by weight of the carbon fibers C and 99 parts by weight of the coated positive electrode active material particles (B-2) were mixed with the above electrolyte solution to prepare an electrolyte solution slurry.

The same stainless steel mesh as that in Example 8 was provided as a film (E). The electrolyte solution slurry was applied to the stainless steel mesh, and then subjected to suction-filtration (depressurization) while pressurizing at 1.5 kg/cm$^2$, so that the coated positive electrode active material particles and the carbon fibers were fixed onto the stainless steel mesh. The electrode was then peeled from the mesh. Thus, a positive electrode for lithium ion batteries was prepared.

Examples 16 and 17

A positive electrode for lithium ion batteries was prepared in the same manner as in Example 15 except that the proportions of the carbon fibers C and the coated positive electrode active material particles (B-2) were changed as shown in Table 3, and that the amount of the electrolyte solution slurry applied was changed to adjust the thickness of the electrode.

Examples 18 and 19

A positive electrode for lithium ion batteries was prepared in the same manner as in Example 15 except that the pressure applied in the pressurization, which was 1.5 kg/cm$^2$ in Example 15, was changed. The pressure was 4.0 kg/cm$^2$ in Example 18 and 35 kg/cm$^2$ in Example 19.

Examples 20 to 23

A positive electrode for lithium ion batteries was prepared in the same manner as in Example 15 except that the carbon fibers C and the coated positive electrode active material particles (B-2) were used as shown in Table 3, and that the amount of the electrolyte solution slurry applied was changed to adjust the thickness of the electrode.

Table 3 shows the following properties of the positive electrodes for lithium ion batteries prepared in Examples 8 to 23: the electrode composition, the thickness, the proportions by volume of the conductive member (A) and the active material (B), the total length of carbon fibers as the conductive member (A) per unit volume of the electrode [expressed as "Total fiber length (cm/cm$^3$) of conductive member (A)" in the table], and the weight per unit area of the electrode.

The thickness of the positive electrode for lithium ion batteries excludes the thickness of the film (E) in Examples 8 to 13 and 15 to 23 and excludes the thickness of the iron plate in Example 14.

pressure of 2.0 kg/cm², so that the voids in the urethane foam were filled with the negative electrode active material particles. Thereafter, the workpiece was dried at 80° C. for 120 minutes at normal pressure to remove the solvent and

TABLE 3

| | Electrode composition (wt %) | | | | | | | | Electrode | |
|---|---|---|---|---|---|---|---|---|---|---|
| | Conductive member (A) | | | | Active material (B) | | Binder PVdF | Conductive additive Acetylene black | Thickness (μm) | Proportion by volume of conductive member (A) (vol %) |
| | Carbon fibers A | Carbon fibers B | Carbon fibers C | LCO | Coated LCO (B-1) | Coated LCO (B-2) | | | | |
| Example 8 | 1.75 | — | — | — | 98.25 | — | — | — | 570 | 6 |
| Example 9 | 1.75 | — | — | — | 98.25 | — | — | — | 500 | 6 |
| Example 10 | — | 1.75 | — | — | 98.25 | — | — | — | 500 | 6 |
| Example 11 | — | 1.75 | — | — | 98.25 | — | — | — | 400 | 6 |
| Example 12 | — | 1.75 | — | — | 98.25 | — | — | — | 250 | 6 |
| Example 13 | — | 1.75 | — | — | 98.25 | — | — | — | 250 | 6 |
| Example 14 | — | 1.75 | — | — | 98.25 | — | — | — | 250 | 6 |
| Example 15 | — | — | 1 | — | — | 99 | — | — | 470 | 2 |
| Example 16 | — | — | 3 | — | — | 97 | — | — | 500 | 6 |
| Example 17 | — | — | 5 | — | — | 95 | — | — | 605 | 10 |
| Example 18 | — | — | 1 | — | — | 99 | — | — | 410 | 2 |
| Example 19 | — | — | 1 | — | — | 99 | — | — | 365 | 2 |
| Example 20 | — | — | 1 | — | — | 99 | — | — | 705 | 2 |
| Example 21 | — | — | 1 | — | — | 99 | — | — | 1128 | 2 |
| Example 22 | — | — | 1 | — | — | 99 | — | — | 2350 | 2 |
| Example 23 | — | — | 1 | — | — | 99 | — | — | 4700 | 2 |

| | Electrode | | | | | | |
|---|---|---|---|---|---|---|---|
| | Total fiber length of conductive member (A) (mg/cm³) | Proportion by volume of active material (B) (vol %) | Weight per unit area (mg/cm²) | Discharge capacity per weight of active material (mAh/g) | | | |
| | | | | 0.1 C | 0.2 C | 0.5 C | 1.0 C |
| Example 8 | 12,092 | 45 | 120 | 150 | 142 | 74 | 32 |
| Example 9 | 13,785 | 51 | 120 | 153 | 151 | 100 | 63 |
| Example 10 | 13,785 | 51 | 120 | 160 | 158 | 134 | 105 |
| Example 11 | 14,359 | 53 | 100 | 160 | 160 | 139 | 117 |
| Example 12 | 13,785 | 51 | 60 | 161 | 160 | 155 | 124 |
| Example 13 | 13,785 | 51 | 60 | 160 | 159 | 152 | 116 |
| Example 14 | 13,785 | 51 | 60 | 152 | 133 | 71 | 35 |
| Example 15 | 2,158,627 | 55 | 120 | 160 | 159 | 155 | 145 |
| Example 16 | 6,212,841 | 51 | 120 | 160 | 158 | 146 | 128 |
| Example 17 | 8,737,794 | 47 | 120 | 160 | 157 | 143 | 112 |
| Example 18 | 2,481,180 | 63 | 120 | 160 | 157 | 145 | 121 |
| Example 19 | 2,840,299 | 72 | 120 | 160 | 156 | 139 | 125 |
| Example 20 | 2,158,627 | 55 | 180 | 160 | 159 | 155 | 145 |
| Example 21 | 2,158,627 | 55 | 288 | 160 | 141 | 125 | 101 |
| Example 22 | 2,158,627 | 55 | 600 | 150 | 123 | 98 | 65 |
| Example 23 | 2,158,627 | 55 | 1200 | 145 | 120 | 85 | 35 |

In the table, LCO refers to LiCoO₂ particles. Coated LCO refers to coated LiCoO₂ particles.

Example 24

The same urethane foam as that in Example 1 was provided as a structure (Z).

Separately, 80.75 parts by weight of non-graphitizable carbon [available from Kureha Battery Materials Japan Co., Ltd., CARBOTRON (registered trademark) PS(F)] as negative electrode active material particles was mixed with a solution of 4.25 parts by weight of polyvinylidene fluoride (available from Sigma-Aldrich) in NMP. Thus, a solvent slurry was prepared.

The solvent slurry in such an amount that the weight of the components in the solvent slurry other than NMP was 85 parts by weight was applied to one main surface of 15 parts by weight of the urethane foam. Pressurization from above the surface with the solvent slurry was performed at a then dried at 80° C. for eight hours under reduced pressure. Thus, a negative electrode for lithium ion batteries was prepared.

Example 25

An amount of 76.5 parts by weight of non-graphitizable carbon [available from Kureha Battery Materials Japan Co., Ltd., CARBOTRON (registered trademark) PS(F)] as negative electrode active material particles and 4.25 parts by weight of acetylene black [available from Denka Company Limited., DENKA BLACK (registered trademark)] were mixed with a solution of 4.25 parts by weight of polyvinylidene fluoride (available from Sigma-Aldrich) in NMP. Thus, a solvent slurry was prepared.

The solvent slurry in such an amount that the weight of the components in the solvent slurry other than NMP was 85 tions by volume of conductive member (A) and the active material (B), and the weight per unit area of the electrode.

TABLE 4

| | Electrode composition (wt %) | | | | Electrode | | | | | | | |
|---|---|---|---|---|---|---|---|---|---|---|---|---|
| | Conductive member (A) | Active material (B) | | Conductive | | Proportion by volume of | Proportion by volume | Weight | Discharge | | | |
| | Ni-plated urethane foam | Coated HC | Binder | additive Acetylene | Thickness | conductive member (A) | of active material (B) | per unit area | capacity per weight of active material (mAh/g) | | | |
| | | HC | (B-3) | PVdF | black | (μm) | (vol %) | (vol %) | (mg/cm²) | 0.1 C | 0.2 C | 0.5 C | 1.0 C |
| Example 24 | 15 | 80.75 | — | 4.25 | — | 700 | 12 | 51 | 61 | 420 | 415 | 370 | 220 |
| Example 25 | 15 | 76.5 | — | 4.25 | 4.25 | 700 | 12 | 50 | 59 | 425 | 420 | 405 | 250 |
| Example 26 | 15 | — | 85 | — | — | 700 | 12 | 50 | 60 | 371 | 363 | 251 | 169 |
| Example 27 | 15 | — | 80 | — | 5 | 700 | 12 | 50 | 59 | 402 | 395 | 367 | 182 |

In the table, HC refers to non-graphitizable carbon paritcles. Coated HC refers to coated non-graphitizable carbon paritcles.

parts by weight was applied to one main surface of 15 parts by weight of the urethane foam. Pressurization from above the surface with the solvent slurry was performed at a pressure of 2.0 kg/cm², so that the voids in the urethane foam were filled with the negative electrode active material particles. Thereafter, the workpiece was dried at 80° C. for 120 minutes at normal pressure to remove the solvent and then dried at 80° C. for eight hours under reduced pressure. Thus, a negative electrode for lithium ion batteries was prepared.

Example 26

The coated negative electrode active material particles (B-3) were mixed with the above electrolyte solution to prepare an electrolyte solution slurry.

An amount of 15 parts by weight of the same urethane foam as that used in Example 24 was provided. The electrolyte solution slurry in such an amount that the weight of the coated negative electrode active material particles was 85 parts by weight was applied to one main surface of the urethane foam. Pressurization from above the surface with the electrolyte solution slurry was performed at 1.5 kg/cm², so that the voids in the urethane foam were filled with the coated negative electrode active material particles. Thus, a negative electrode for lithium ion batteries was prepared.

Example 27

An amount of 80 parts by weight of the coated negative electrode active material particles (B-3) and 5 parts by weight of acetylene black [available from Denka Company Limited., DENKA BLACK (registered trademark)] were mixed with the above electrolyte solution to prepare an electrolyte solution slurry.

An amount of 15 parts by weight of the same urethane foam as that in Example 24 was provided. The electrolyte solution slurry in such an amount that the weight of components in the electrolyte solution slurry other than the electrolyte solution was 85 parts by weight was applied to one surface of the urethane foam. Pressurization from above the surface with the electrolyte solution slurry was performed at 1.5 kg/cm², so that the voids in the urethane foam were filled with the coated negative electrode active material particles. Thus, a negative electrode for lithium ion batteries was prepared.

Table 4 shows the following properties of the negative electrodes for lithium ion batteries prepared in Examples 24 to 27: the electrode composition, the thickness, the propor- Example 28

The same carbon fibers B as those in Example 10 were provided as a conductive member (A).

An amount of 4.2 parts by weight of the carbon fibers B and 95.8 parts by weight of the same non-graphitizable carbon as that in Example 24 as negative electrode active material particles were mixed with the above electrolyte solution. Thus, an electrolyte solution slurry was prepared.

An aramid separator (available from Japan Vilene Company, Ltd.) was provided as a film (E). The electrolyte solution slurry was applied to the separator and subjected to suction-filtration (depressurization) while pressurizing at 1.5 kg/cm², so that the negative electrode active material particles and the carbon fibers were fixed onto the aramid separator. Thus, a negative electrode for lithium ion batteries was prepared.

Examples 29 and 30

A negative electrode for lithium ion batteries was prepared in the same manner as in Example 28 except that the amount of the electrolyte solution slurry applied was smaller than in Example 28 to reduce the thickness of the electrode.

Example 31

A negative electrode for lithium ion batteries was prepared in the same manner as in Example 28 except that 95.8 parts by weight of the coated negative electrode active material particles (B-3) were used as negative electrode active material particles instead of 95.8 parts by weight non-graphitizable carbon.

Examples 32 and 33

A negative electrode for lithium ion batteries was prepared in the same manner as in Example 31 except that the amount of the electrolyte solution slurry applied was smaller than in Example 31 to reduce the thickness of the electrode.

Example 34

The same carbon fibers C as those in Example 15 were provided as a conductive member (A).

A negative electrode for lithium ion batteries was prepared in the same manner as in Example 28 except that 4.2 parts by weight of the carbon fibers C were used as the conductive member (A) instead of the carbon fibers B, and that 95.8 parts by weight of the coated negative electrode active material particles (B-3) were used as the negative electrode active material particles instead of 95.8 parts by weight of non-graphitizable carbon.

Examples 35 to 37

A negative electrode for lithium ion batteries was prepared in the same manner as in Example 34 except that the coated negative electrode active material particles (B-4) were used instead of the coated negative electrode active material particles (B-3), and that the proportions of the carbon fibers C and the coated negative electrode active material particles (B-4) were changed as shown in Table 5.

Examples 38 to 40

A negative electrode for lithium ion batteries was prepared in the same manner as in Example 35 except that the carbon fibers C and the coated negative electrode active material particles (B-4) were used as shown in Table 5, and the amount of the electrolyte solution slurry applied was changed to adjust the thickness of the electrode.

Example 41

In Example 35, the obtained electrolyte solution slurry was applied to copper foil with a thickness of 20 μm thick as a current collector, instead of an aramid separator. After the application, an aramid separator was disposed on the slurry, followed by pressurization from the upper surface of the separator at 1.5 kg/cm$^2$, so that liquid exuded from the upper surface of the separator. The liquid was absorbed. Thus, a negative electrode for lithium ion batteries containing a current collector was prepared.

Table 5 shows the following properties of the negative electrodes for lithium ion batteries prepared in Examples 28 to 41: the electrode composition, the thickness, the proportions by volume of the conductive member (A) and the active material (B), the total fiber length of carbon fibers as a conductive member (A) per unit volume of the electrode [expressed as "Total fiber length (cm/cm$^3$) of conductive member (A)" in the table], and the weight per unit area of the electrode.

TABLE 5

| | Electrode composition (wt %) | | | | | | | Electrode | |
|---|---|---|---|---|---|---|---|---|---|
| | Conductive member (A) | | Active material (B) | | | | | | Proportion by volume of conductive member (A) (vol %) |
| | Carbon fibers B | Carbon fibers C | HC | Coated HC (B-3) | Coated HC (B-4) | Binder PVdF | Conductive additive Acetylene black | Thickness (μm) | |
| Example 28 | 4.2 | — | 95.8 | — | — | — | — | 880 | 1.5 |
| Example 29 | 4.2 | — | 95.8 | — | — | — | — | 650 | 1.5 |
| Example 30 | 4.2 | — | 95.8 | — | — | — | — | 390 | 1.5 |
| Example 31 | 4.2 | — | — | 95.8 | — | — | — | 880 | 1.5 |
| Example 32 | 4.2 | — | — | 95.8 | — | — | — | 690 | 1.5 |
| Example 33 | 4.2 | — | — | 95.8 | — | — | — | 410 | 1.5 |
| Example 34 | — | 4.2 | — | 95.8 | — | — | — | 500 | 1.5 |
| Example 35 | — | 2 | — | — | 98 | — | — | 490 | 1.5 |
| Example 36 | — | 4.2 | — | — | 95.8 | — | — | 500 | 1.5 |
| Example 37 | — | 6 | — | — | 94 | — | — | 520 | 1.5 |
| Example 38 | — | 2 | — | — | 98 | — | — | 980 | 1.5 |
| Example 39 | — | 2 | — | — | 98 | — | — | 2450 | 1.5 |
| Example 40 | — | 2 | — | — | 98 | — | — | 3920 | 1.5 |
| Example 41 | — | 2 | — | — | 98 | — | — | 490 | 1.5 |

| | Electrode | | | | | | |
|---|---|---|---|---|---|---|---|
| | Total fiber length of conductive member (A) (cm/cm$^3$) | Proportion by volume of active material (B) (vol %) | Weight per unit area (mg/cm$^2$) | Discharge capacity per weight of active material (mAh/g) | | | |
| | | | | 0.1 C | 0.2 C | 0.5 C | 1.0 C |
| Example 28 | 10,107 | 45 | 67 | 401 | 387 | 294 | 164 |
| Example 29 | 10,211 | 45 | 50 | 407 | 391 | 346 | 194 |
| Example 30 | 10,211 | 45 | 30 | 415 | 408 | 387 | 358 |
| Example 31 | 11,230 | 45 | 67 | 399 | 374 | 284 | 257 |
| Example 32 | 10,688 | 46 | 50 | 397 | 382 | 326 | 297 |
| Example 33 | 10,793 | 46 | 30 | 397 | 385 | 374 | 341 |
| Example 34 | 3,155,817 | 48 | 43 | 410 | 391 | 341 | 261 |
| Example 35 | 1,499,014 | 48 | 43 | 405 | 395 | 364 | 346 |
| Example 36 | 3,155,817 | 46 | 43 | 400 | 394 | 381 | 362 |
| Example 37 | 4,417,922 | 45 | 43 | 397 | 385 | 364 | 342 |
| Example 38 | 1,499,014 | 48 | 86 | 370 | 335 | 285 | 228 |
| Example 39 | 1,499,014 | 48 | 215 | 358 | 310 | 251 | 192 |
| Example 40 | 1,499,014 | 48 | 344 | 335 | 284 | 231 | 145 |
| Example 41 | 1,499,014 | 48 | 43 | 410 | 397 | 371 | 348 |

In the table, HC refers to non-graphitizable carbon paritcles. Coated HC refers to coated non-graphitizable carbon paritcles.

Comparative Example 1

An amount of 90 parts by weight of $LiCoO_2$ powder [available from Nippon Chemical Industrial Co., Ltd. CELLSEED C-8G] as positive electrode active material particles and 5 parts by weight of acetylene black [available from Denka Company Limited., DENKA BLACK (registered trademark)] were mixed with a solution of 5 parts by weight of polyvinylidene fluoride (available from Sigma-Aldrich) in NMP. Thus, a solvent slurry was prepared.

The solvent slurry was applied to one surface of aluminum electrolytic foil having a thickness of 20 μm with a wire bar in the air. The slurry was dried at 100° C. for 15 minutes. Thus, a positive electrode for lithium ion batteries of Comparative Example 1 was prepared.

Comparative Example 2

An amount of 95 parts by weight of non-graphitizable carbon [available from Kureha Battery Materials Japan Co., Ltd., CARBOTRON (registered trademark) PS(F)] as negative electrode active material particles was mixed with a solution of 5 parts by weight of polyvinylidene fluoride (available from Sigma-Aldrich) in NMP. Thus, a solvent slurry was prepared.

The solvent slurry was applied to one surface of copper foil having a thickness of 20 μm with a wire bar in the air. The workpiece was dried at 80° C. for three hours at normal pressure and then vacuum-dried at 80° C. for eight hours to evaporate the solvent. Thus, a negative electrode for lithium ion batteries of Comparative Example 2 was prepared.

Table 6 shows the following properties of the positive electrode and negative electrode prepared in Comparative Examples 1 and 2: the electrode composition, the thickness, the proportions by volume of the conductive member (A) and the active material (B), and the weight per area of the electrode.

[Preparation of Lithium Ion Battery for Evaluating Positive Electrode]

Each of the positive electrodes prepared in Examples 1 to 23 and Comparative Example 1 was punched into a size of 17 mmφ. The punched-out electrode and a negative electrode made of Li metal having a size of 17 mmφ were disposed at both ends inside a 2032 type coin cell.

Aluminum electrolytic foil having a thickness of 20 μm was used as a current collector on the positive electrode side.

In the case of the positive electrodes of Examples 8 to 12, which were fixed onto stainless steel mesh, the stainless steel mesh was located on the current collector side.

Two separators (Celgard 3501) were interposed between the electrodes. Thus, a cell for lithium ion batteries was prepared. The above electrolyte solution was poured into the cell, and the cell was sealed. The discharge capacity (mAh) was measured by the method below. The resulting value was divided by the weight of the active material, and the discharge capacity (mAh/g) per weight of the active material was evaluated.

[Preparation of a Lithium Ion Battery for Evaluating Negative Electrode]

Each of the negative electrodes prepared in Examples 24 to 41 and Comparative Example 2 was punched into a size of 17 mmφ. The punched-out electrode and a positive electrode made of Li metal having a size of 17 mmφ were disposed at both ends inside a 2032 type coin cell.

Copper foil having a thickness of 20 μm was used as a current collector on the negative electrode side. In the case of the negative electrodes of Examples 28 to 40, in which an aramid separator was used, the aramid separator was located on the separator side (positive electrode side).

In the case of the negative electrode of Example 41, which was integrated with a current collector and a separator, copper foil as a current collector was not used and the aramid separator was located on the separator side (positive electrode side).

Two separators (Celgard 3501) were interposed between the electrodes. Thus, a cell for lithium ion batteries was prepared. The above electrolyte solution was poured into the cell, and the cell was sealed. The discharge capacity (mAh) was measured by the method below. The resulting value was divided by the weight of the active material, and the discharge capacity (mAh/g) per weight of the active material was evaluated.

TABLE 6

| | Electrode composition (wt %) | | | | | Electrode | | | | | | |
| | | | | | | Proportion by volume of conductive member (A) | Proportion by volume of active material (B) | Weight per unit area | Discharge capacity per weight of active material (mAh/g) | | | |
| | Conductive member (A) | Active material (B) | Binder | Conductive additive | Thickness | | | | | | | |
| | — | LCO HC | PVdF | Acetylene black | (μm) | (vol %) | (vol %) | (mg/cm$^2$) | 0.1 C | 0.2 C | 0.5 C | 1.0 C |
| Comparative Example 1 | — | 90 — | 5 | 5 | 400 | 0 | 55 | 120 | 124 | 94 | 31 | 14 |
| Comparative Example 2 | — | — 95 | 5 | — | 600 | 0 | 55 | 67 | 270 | 243 | 114 | 35 |

In the table, LCO refers to $LiCoO_2$ particles. HC refers to non-graphitizable carbon particles.

<Evaluation of Discharge Capacity of Lithium Ion Battery>

Using a charge/discharge measuring apparatus "Battery analyzer Model 1470" [available from TOYO Corporation], the batteries were each charged at 0.1 C, 0.2 C, 0.5 C, or 1.0 C at room temperature. The batteries for evaluating a negative electrode were charged until the voltage reached 2.5 V and the batteries for evaluating a positive electrode were charged until the voltage reached 4.3 V. After a 10-minute rest, the batteries were discharged at 0.1 C, 0.2 C, 0.5 C, or 1.0 C. The batteries for evaluating a negative electrode were discharged until the voltage reached 10 mV and the batteries for evaluating the positive electrode were discharged until the voltage reached 2.7 V, and the battery capacity was measured.

Tables 1 to 6 show the discharge capacity (mAh/g) per weight of active material in the examples and the comparative examples.

The electrodes for lithium ion batteries according to the examples, even ones having an increased thickness, had excellent electrical conductivity. It was found that higher discharge capacity per weight of the active material was exhibited despite the increased thickness. The electrode of the present invention can be used as an electrode for lithium ion batteries excellent in the discharge capacity per unit area.

INDUSTRIAL APPLICABILITY

The electrode for lithium ion batteries according to the present invention is particularly useful as an electrode for, for example, bipolar secondary batteries and lithium ion secondary batteries for cellular phones, personal computers, hybrid automobiles, and electric vehicles.

REFERENCE SIGNS LIST

Lithium Ion Battery 1
Electrode (positive electrode) for lithium ion batteries 10, 110, 210, 210', 310
First main surface of positive electrode 11, 111, 211, 311
Second main surface of positive electrode 12, 112, 212, 312
Conductive fiber constituting part of nonwoven fabric 13, 13a, 13b
Positive electrode active material particles 14
Coating agent 15, 25
Conductive additive 16, 26
Electrode (negative electrode) for lithium ion batteries 20, 220
First main surface of negative electrode 21, 221
Second main surface of negative electrode 22, 222
Negative electrode active material particles 24
Separator 30
Current collector 40, 50
Nonwoven fabric (structure) 60
Second main surface of nonwoven fabric 62
Filter paper 70, 470
Conductive fiber constituting part of woven fabric 113
Warp yarn 113a
Weft yarn 113b
Conductive fiber dispersed between first main surface and second main surface 213, 213a, 213b, 223
Resin 214
Slurry layer 225
Resin provided with conductivity 313
Plate 570

The invention claimed is:

1. A method of producing an electrode for lithium ion batteries,
the electrode comprising:
a first main surface to be located adjacent to a separator of a lithium ion battery; and
a second main surface to be located adjacent to a current collector of the lithium ion battery,
wherein
the electrode has a thickness of 150 to 5000 µm,
the electrode contains, between the first main surface and the second main surface, a conductive member (A) made of an electronically conductive material and a large number of active material particles (B),
the electrode is free of a binder,
the conductive member (A) comprises conductive fibers dispersed between the first main surface and the second main surface,
the conductive fibers have an electrical conductivity of 50 ms/cm or more,
at least part of the conductive member (A) forms a conductive path that electrically connects the first main surface to the second main surface,
the conductive path is in contact with the active material particles (B) around the conductive path, and
the active material particles (B) comprise coated active material particles whose surface is at least partially coated with a coating agent containing a coating resin and a conductive additive,
wherein the coating resin is selected from the group consisting of vinyl resins, urethane resins, polyester resins, polyamide resins, epoxy resins, polyimide resins, silicone resins, phenol resins, melamine resins, urea resins, aniline resins, ionomer resins, and polycarbonates,
the method comprising:
step (Q1) of applying a slurry (Y) containing the conductive member (A) and the active material particles (B) to a film (E); and
step (Q2) of fixing the active material particles (B) and the conductive member (A) onto the film (E) by pressurization or depressurization.

2. The method of producing the electrode for lithium ion batteries according to claim 1,
wherein the slurry (Y) is an electrolyte solution slurry (Y1) containing an electrolyte solution (D),
the film (E) is impermeable to the active material particles (B) but permeable to the electrolyte solution (D), and
in step (Q2), the electrolyte solution (D) is allowed to permeate the film (E) by pressurization or depressurization so as to be removed.

3. The method of producing the electrode for lithium ion batteries according to claim 1,
wherein a press step (Q3) of pressurizing the slurry (Y) at a higher pressure is performed after step (Q2).

4. The method of producing the electrode for lithium ion batteries according to claim 1,
wherein the film (E) has an electrical conductivity of 100 mS/cm or more.

5. The method of producing the electrode for lithium ion batteries according to claim 1, further comprising step (Q4) of transferring the electrode for lithium ion batteries fixed onto the film (E) to a main surface of a current collector or a separator to produce an electrode for lithium ion batteries having a first main surface thereof on the main surface of the separator, or to produce an electrode for lithium ion batteries having a second main surface thereof on the main surface of the current collector.

* * * * *